United States Patent
Zou et al.

(10) Patent No.: US 9,607,355 B2
(45) Date of Patent: Mar. 28, 2017

(54) MODEL PARALLEL PROCESSING METHOD AND APPARATUS BASED ON MULTIPLE GRAPHIC PROCESSING UNITS

(71) Applicant: TENCENT TECHNOLOGY (SHENZHEN) COMPANY LIMITED, Shenzhen (CN)

(72) Inventors: Yongqiang Zou, Shenzhen (CN); Yi Li, Shenzhen (CN); Xing Jin, Shenzhen (CN); Bin Xiao, Shenzhen (CN); Zhimao Guo, Shenzhen (CN); Wei Xue, Shenzhen (CN); Bo Chen, Shenzhen (CN); Yong Li, Shenzhen (CN); Lei Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/107,475

(22) PCT Filed: Jun. 19, 2015

(86) PCT No.: PCT/CN2015/081964
§ 371 (c)(1),
(2) Date: Jun. 23, 2016

(87) PCT Pub. No.: WO2015/192806
PCT Pub. Date: Dec. 23, 2015

(65) Prior Publication Data
US 2016/0321776 A1 Nov. 3, 2016

(30) Foreign Application Priority Data
Jun. 20, 2014 (CN) .......................... 2014 1 0281130

(51) Int. Cl.
*G06F 15/80* (2006.01)
*G06T 1/20* (2006.01)

(52) U.S. Cl.
CPC ............ *G06T 1/20* (2013.01); *G06T 2200/28* (2013.01)

(58) Field of Classification Search
CPC . G06T 1/20; G06F 9/505; G06F 13/14; G06F 9/38; G06F 2209/483; G09G 5/001
See application file for complete search history.

(56) References Cited

U.S. PATENT DOCUMENTS

2009/0259996 A1* 10/2009 Grover .................... G06F 8/456
717/136
2012/0242672 A1 9/2012 Larson

FOREIGN PATENT DOCUMENTS

| CN | 102999756 A | 3/2013 |
| CN | 103020990 A | 4/2013 |

(Continued)

OTHER PUBLICATIONS

Dominik Scherer et al., "Accelerating Large-Scale Convolutional Neural Networks with Parallel Graphics Multiprocessors", Artificial Neural Networks—ICANN 2010 (Book), Sep. 2010 from Springer Link.*

(Continued)

*Primary Examiner* — Hau Nguyen
(74) *Attorney, Agent, or Firm* — Marshall, Gerstein & Borun LLP

(57) ABSTRACT

A parallel data processing method based on multiple graphic processing units (GPUs) is provided, including: creating, in a central processing unit (CPU), a plurality of worker threads for controlling a plurality of worker groups respectively, the worker groups including a plurality of GPUs; binding each worker thread to a corresponding GPU; loading one batch of training data from a nonvolatile memory to (Continued)

a GPU video memory corresponding to one worker group; transmitting, between a plurality of GPUs corresponding to one worker group, data required by data processing performed by the GPUs through peer to peer; and controlling the plurality of GPUs to perform data processing in parallel through the worker threads.

14 Claims, 21 Drawing Sheets

(56) References Cited

FOREIGN PATENT DOCUMENTS

| | | |
|---|---|---|
| CN | 103488662 A | 1/2014 |
| CN | 103532710 A | 1/2014 |
| CN | 103617085 A | 3/2014 |
| CN | 104036451 A | 9/2014 |

OTHER PUBLICATIONS

Raina et al., "Large-scale Deep Unsupervised Learning Using Graphics Processors", Proceedings of the 26th International Conference on Machine Learning, Montreal, Canada, 2009, 8 pages.

Krizhevsky et al., "ImageNet Classification with Deep Convolutional Neural Networks", Neural Information Processing Systems, NIPS 2012, 9 pages.

A.T.C. Goh, "Back-propagation Neural Networks for Modeling Complex Systems", Artificial Intelligence in Engineering, vol. 9, 1995, pp. 143-151.

Yadan et al., "Multi-GPU Training of ConvNets", arXiv: 1312.5853v4 [cs.LG], Feb. 18, 2014, 4 pages.

Dean et al., "Large Scale Distributed Deep Networks", Neural Information Processing Systems, NIPS 2012, 11 pages.

Hinton et al., "A Fast Learning Algorithm for Deep Belief Nets", Neural Computation, vol. 18, 2006, pp. 1527-1554.

International Search Report and Written Opinion, International Application No. PCT/CN2015/081964, mailed Sep. 25, 2015.

Office Action from Chinese Application No. 2014102811307 dated Oct. 9, 2016.

Kirk et al. "Programming Massively Parallel Processors," A Hands-on Approach (2010).

* cited by examiner

Logical topology structure    Implemented topology structure

MODEL PARALLEL PROCESSING METHOD AND APPARATUS BASED ON MULTIPLE GRAPHIC PROCESSING UNITS

CROSS-REFERENCE TO RELATED APPLICATION

This application is a national phase of International Application PCT/CN2015/081964 filed on Jun. 19, 2015, which claims benefit of and priority to Chinese Patent Application No. 201410281130.7 filed on Jun. 20, 2014 entitled "Model Parallel Processing Method and Apparatus Based on Multiple Graphic Processing Units". The entire disclosures of each of the above applications are incorporated herein by reference.

FIELD OF THE TECHNOLOGY

The present disclosure relates to the field of computer technologies, and in particular, to a data parallel processing method and apparatus based on multiple graphic processing units (GPUs).

BACKGROUND OF THE DISCLOSURE

In a direction of general-purpose computing, multiple GPUs (GPU processor) use a design concept totally different from that of a CPU processor, as shown in FIG. 1, different from a "multi-core" concept of the CPU, the design of the GPU moves towards a "many-core" direction, many cores consist of a large number of smaller cores, and with development of computers, the number of cores has been doubled constantly.

With rapid development of GPU hardware, massively parallel processor resources are aggregated on the GPUs, thus helping to map a parallel computing portion in the general-purpose computing into a GPU platform, to cause a GPU technology to accelerate parallel applications to become more and more popular. However, implementation of a deep neural network (DNN) system based on a single GPU is still serialization implementation because the degree of parallelism of current implementation solutions mainly exists in parallelization of matrix operations, to map tens of thousands of dimensional matrices into a GPU parallel computing scenario to enhance a single processing speed, but parallelism of processing data, between each batch of data computing and of the DNN per se is not taken into account. Faced with demands of deep networks with massive training data and complicated training, when GPUs are used to carry out training, due to serious insufficient performance existing in an experiment process, it often takes a week and even a few weeks to achieve model convergence, which cannot meet the demands for carrying out more tests for training large-scale networks. At present, it is very common to install a plurality of GPU cards on a server, and it is a more and more popular development direction to use a multi-GPU parallel acceleration technology to expand parallelism of compute-intensive applications and increase program performance in the field of general-purpose computing.

A data exchange model based on peer to peer has serious deficiencies in performance: more data exchange cycles are required when there are more than two parallel units, and waiting exists within each data exchange cycle, which does not make full use of idle bus bandwidth. It is necessary to innovatively implement a parameter exchange mechanism in a multi-GPU data parallel technology to solve the deficiencies.

After the performance problem of the model training is solved, it is further necessary to solve the convergence speed problem in the model training process, to further improve the training performance from the aspect of a training algorithm. In the existing technology, a fixed learning rate is used to update parameters, and a large number of tasks of manually regulating the learning rate and judging convergence mingle in the training experiment process, which is complicated, tedious and has low efficiency.

SUMMARY

In view of this, the present disclosure provides a parallel data processing method based on multiple GPUs and an apparatus thereof, which can enhance data parallel processing efficiency.

A parallel data processing method based on multiple GPUs, including the following steps:
creating, in a CPU, a plurality of worker threads for controlling a plurality of worker groups respectively, the worker groups including one or more GPUs;
binding each worker thread to a corresponding GPU;
loading a plurality of batches of training data from a nonvolatile memory to GPU video memories in the plurality of worker groups; and
controlling the plurality of GPUs to perform data processing in parallel through the worker threads.

A parallel data processing apparatus based on multiple GPUs, including:
a thread creation module, configured to create, in a CPU, a plurality of worker threads for controlling a plurality of worker groups respectively, the worker groups including one or more GPUs;
a thread binding module, configured to bind each worker thread to a corresponding GPU;
a data distribution module, configured to load a plurality of batches of training data from a nonvolatile memory to GPU video memories in the plurality of worker groups; and
a data processing control module, configured to control the plurality of GPUs to perform data processing in parallel through the worker threads.

A parallel data processing method based on multiple GPUs, including the following steps:
creating, in a CPU, a plurality of worker threads for controlling a plurality of worker groups respectively, the worker groups including a plurality of GPUs;
binding each worker thread to a corresponding GPU;
loading one batch of training data from a nonvolatile memory to a GPU video memory corresponding to one worker group;
transmitting, between a plurality of GPUs corresponding to one worker group, data required by data processing performed by the GPUs through peer to peer; and
controlling the plurality of GPUs to perform data processing in parallel through the worker threads.

A parallel data processing apparatus based on multiple GPUs, including:
a thread creation module, configured to create, in a CPU, a plurality of worker threads for controlling a plurality of worker groups respectively, the worker groups including a plurality of GPUs;
a thread binding module, configured to bind each worker thread to a corresponding GPU;

a data distribution module, configured to load one batch of training data from a nonvolatile memory to a GPU video memory corresponding to one worker group;

a transmission module, configured to transmit, between a plurality of GPUs corresponding to one worker group, data required by data processing performed by the GPUs through peer to peer; and a data processing control module, configured to control the plurality of GPUs to perform data processing in parallel through the worker threads.

According to the methods and apparatuses, specific processing operations are performed in a plurality of GPUs, and scheduling of each GPU is implemented by an exclusive CPU thread, therefore, in the whole data processing process, both the processing operations in the GPUs and thread scheduling in the CPU run in parallel, thereby enhancing data processing efficiency. In addition, introduction of the transmission module enhances storage access efficiency, and further enhances the data processing efficiency.

In order to make the foregoing and other objectives, features and advantages of the present disclosure more comprehensible, detailed description is given below with reference to preferred embodiments and the accompanying drawings.

DESCRIPTION OF EMBODIMENTS

Figure 1:
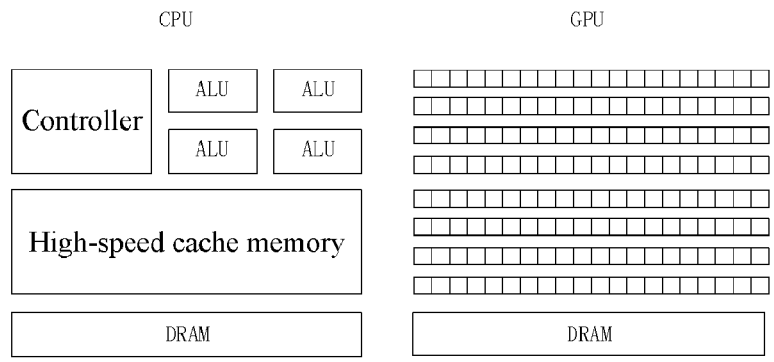
FIG. 1 is a schematic diagram of comparison of architectures of a CPU and a GPU.

A DNN technology is currently a technology popular in the field of machine learning, and has successful cases in both academia and industry, including speech recognition, image recognition, natural language processing and advertisement recommendation. The article "Large-scale Deep Unsupervised Learning using Graphics Processors" published by Rajat Raina, Anand Madhavan, Andrew Y. Ng et al. at the 26th international machine learning conference (Montreal, Canada, 2009) introduces implementation of methods and systems of training a DNN by using a single GPU; the article "ImageNet Classification with Deep Convolutional Neural Networks" published by Alex Krizhevsky, Ilya Sutskever, Geoffrey E. Hinton et al. on *Neural Information Processing Systems* 2012 introduces implementation of methods and systems of training a CNN by using a single GPU.

The basic concept of a backward propagation algorithm (BP algorithm) used in the DNN training is that a learning process consists of two processes, that is, sample input forward propagation and error backward propagation. The forward propagation means loading input data from an input layer, propagating the input data to each hidden layer for processing, and finally outputting features to an output layer; the backward propagation means back-propagating output errors in a certain form layer by layer through each hidden layer, computing an updated gradient on each hidden layer through an updated error value, and finally feeding back the updated gradient to the input layer. After each forward propagation and backward propagation, it is necessary to update the gradient to a weighting parameter at each layer. Please refer to A. T. C. Goh. Back-propagation neural networks for modeling complex systems [J]. Artificial Intelligence in Engineering, 1995.

In the direction of general-purpose computing, with emergence and development of a NVIDIA Compute Unified Device Architecture (CUDA), it is simpler to complete the general-purpose computing by using GPUs, which can obtain a speed-up ratio for several times, dozens of times or even one hundred times in lots of applications such as the field of general-purpose computing widely used in the industry. Please refer to David B. Kirk, Wen-mei W. Hwu. Massively Parallel Processor Programming in Practice (2nd edition) [M]. Tsinghua University Press, November 2013.

Omry Yadan, Keith Adams, Yaniv Taigman, Marc'Aurelio Ranzato. Multi-GPU Training of ConvNets.arXiv: 1312.5853v4 [cs.LG], Feb. 18, 2014 is implementation of training of a CNN on multiple GPUs published by Facebook Company, which makes effective speed-up achievement, and a speed-up ratio for 2.2 times can be achieved at most by using 4 GPUs compared with 1 GPU. It has been proved in practice that the training process of the DNN has sufficient task parallelism and data parallelism, while the application of the multi-GPU technology makes effective use of characteristics of parallelism, which can speed up the training process of the DNN, thus reducing time costs and expense costs of carrying out tests and obtaining achievement of higher revenues. Faced with demands of deep networks with massive training data and complicated training, when GPUs are used to carry out training, due to serious insufficient performance existing in an experiment process, it often takes a week and even a few weeks to achieve model convergence, which cannot meet the demands for carrying out more tests for training large-scale networks. In order to solve such a technical problem, embodiments of the present invention provide a parallel data processing method and apparatus based on multiple GPUs.

To further explain the technical means used in the present disclosure for solving the foregoing technical problem and the effects thereof, specific implementation manners, structures, features, and effects of the present disclosure are described in detail below with reference to the accompanying drawings and preferred embodiments.

Figure 2:
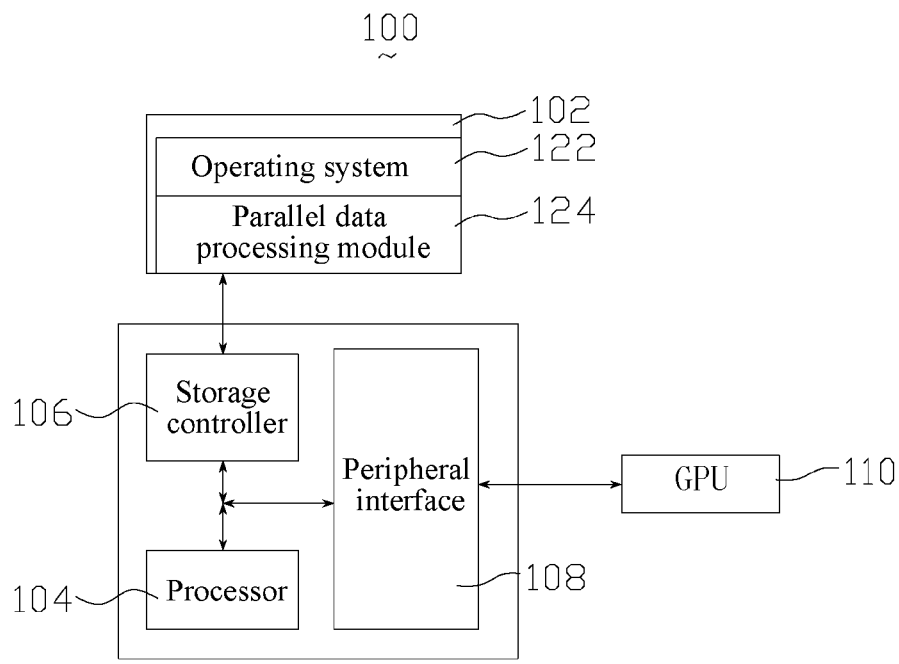
FIG. 2 is a structural block diagram of a server.

FIG. 2 is a structural block diagram of a computer or server. As shown in FIG. 2, the server 100 includes a memory 102, one or more processors 104, a memory controller 106, a peripheral interface 108 and one or more GPUs 110. It may be understood that FIG. 2 merely shows a schematic structure, but does not limit the structure of the server 100. For example, the server 100 may also include more or fewer components than those shown in FIG. 2, or have a configuration different from that shown in FIG. 2.

The memory 102 may be configured to store a software program and module, such as a program instruction/module corresponding to a method and an apparatus for an instant messaging (IM) session in the embodiments of the present invention, and the processors 104 execute different functional applications and perform data processing by running the software program and module stored in the memory 102, thereby implementing the method.

The memory 102 may include a high-speed random memory, and may also include a nonvolatile memory, for example, one or more magnetic storage devices, flash memories or other nonvolatile solid-state memories. In some embodiments, the memory 102 may further include memories remotely disposed relative to the processor 106, and these remote memories may be connected to an electronic terminal 100 through a network. Examples of the network include, but are not limited to, the Internet, an intranet, a local area network, a mobile communications network, or a combination thereof. The processor 106 and other possible components may access the memory 102 under the control of the memory controller 104.

The peripheral interface 108 couples various input/output devices to the processor 106. The processor 106 runs different software inside the memory 102 to instruct the computer 100 to perform different functions and perform data processing. In some embodiments, the peripheral interface 108, the processor 106, and the memory controller 104 may be implemented in a single chip. In some other embodiments, they may be separately implemented by an independent chip.

Figure 3:
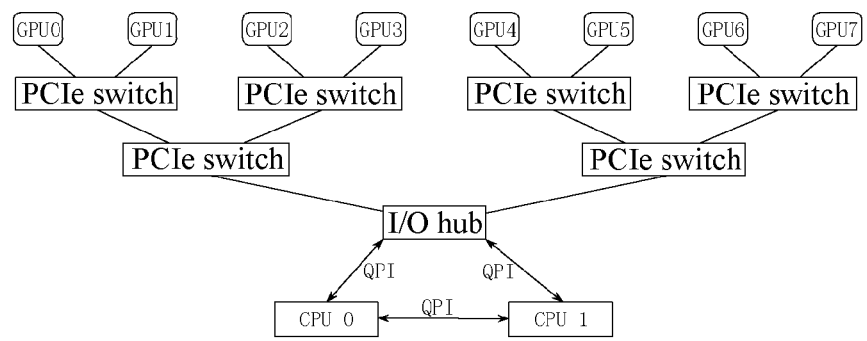
FIG. 3 is a schematic structural diagram of a connection structure of GPUs in the server of FIG. 2.

The GPU 110 is connected to the processors 104 through a peripheral interface bus, for example, a Peripheral Component Interconnect Express (PCIe) bus. In a specific example, the server 100 includes a plurality of (e.g., 2) processors 104 and a plurality of (e.g., 8) GPUs 110. FIG. 3 is a schematic diagram of a connection structure of the GPUs 110 and the processors 104 in the specific example. The two processors 104 (CPU 0 and CPU 1) and one I/O Hub are interconnected through Quick-Path Interconnect (QPI) of the Intel. The I/O Hub is connected with two PCIe switches, each PCIe switch is respectively connected with other two PCIe switches, and the PCIe switches located at the end each are connected with two GPUs; therefore, the I/O Hub, in essence, connects 8 GPUs into the bus. It may be understood that the number of the GPUs or the number of the PCIe switches is not limited to that shown in FIG. 3, which can include more or fewer GPUs.

In an actual production environment, the structure of a hardware system of a computer installed with multiple GPUs is as shown in FIG. 3, the example discloses hardware configuration of a computer with 8 GPU nodes, each two GPU sockets are installed to a GPU-specific PCI slot, GPU sockets 0, 1, 2 and 3 are installed to a CPU through a PCIe switch, GPU sockets 4, 5, 6 and 7 are installed to another CPU, and the two CPUs are connected through IOH.

The software program and module includes: an operating system 122 and a data processing module 124. The operating system 122, for example, may be LINUX, UNIX, WINDOWS or any other available operating system, and the operating system 122 may include various software components and/or drives configured to manage system tasks (e.g., memory management, storage device control, power management and the like), and may communicate with various hardware or software components, so as to provide an operating environment for other software components. The parallel data processing module 124 runs on the basis of the operating system 122, configured to implement the parallel data processing methods according to the embodiments of the present invention.

Figure 4:
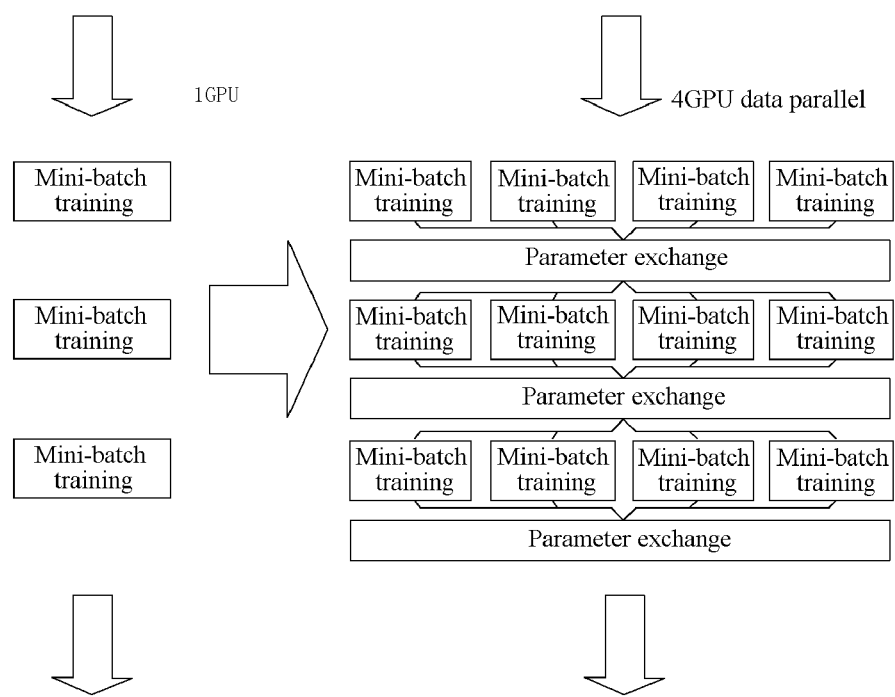
FIG. 4 is a schematic diagram of comparison of flows of single-GPU data processing and multi-GPU parallel data processing.

FIG. 4 discloses that differences between single-GPU training and multi-GPU data parallel training mainly lie in: for the single-GPU training, only one mini-batch can be trained within each training cycle, and the operation of updating model parameters is completed in passing after training of the mini-batch ends; a plurality of groups of mini-batch data are trained simultaneously at a plurality of GPUs, each data parallel group makes full use of exclusive GPU computing resources assigned to the group, a process of exchanging and updating parameters from various GPUs is further required when the training of the mini-batch ends, and finally each GPU holds the latest model copy, to continue the next training process.

Distribution of training data begins in the CPU, while specific training operations are performed by GPU worker groups. Each GPU worker group includes one or more GPUs. As a GPU card is usually regarded as an accelerator card or a coprocessor card, and must be called for computing in a CPU-based host context, that is to say, scheduling of data parallel training in the GPUs should be implemented based on threads in the CPU. In order to give play to parallelism effectiveness when multiple GPUs jointly participate in computing, one GPU may be bound to one CPU thread (worker thread, also referred to as worker), and then scheduling of data parallel training is implemented through the CPU threads in a CPU context. In one example, a binding relationship between CPU threads and GPUs as well as GPU worker groups is as shown in Table 1.

TABLE 1

Binding relationship between GPU data parallel CPU threads, GPU cards and worker groups

| Worker Group 0 | Worker Group 1 | Worker Group 2 | Worker Group 3 |
|---|---|---|---|
| CPU thread 0 | CPU thread 1 | CPU thread 2 | CPU thread 3 |
| GPU 0 | GPU 1 | GPU 2 | GPU 3 |

Binding relationship between GPU data parallel + model parallel CPU threads, GPU cards and worker groups, worker units

| | Worker Group 0 | Worker Group 1 | Worker Group 2 | Worker Group 3 |
|---|---|---|---|---|
| Worker 0 | CPU thread 0 GPU 0 | CPU thread 2 GPU 2 | CPU thread 4 GPU 4 | CPU thread 6 GPU 6 |
| Worker 1 | CPU thread 1 GPU 1 | CPU thread 3 GPU 3 | CPU thread 5 GPU 5 | CPU thread 7 GPU 7 |

Figure 5:
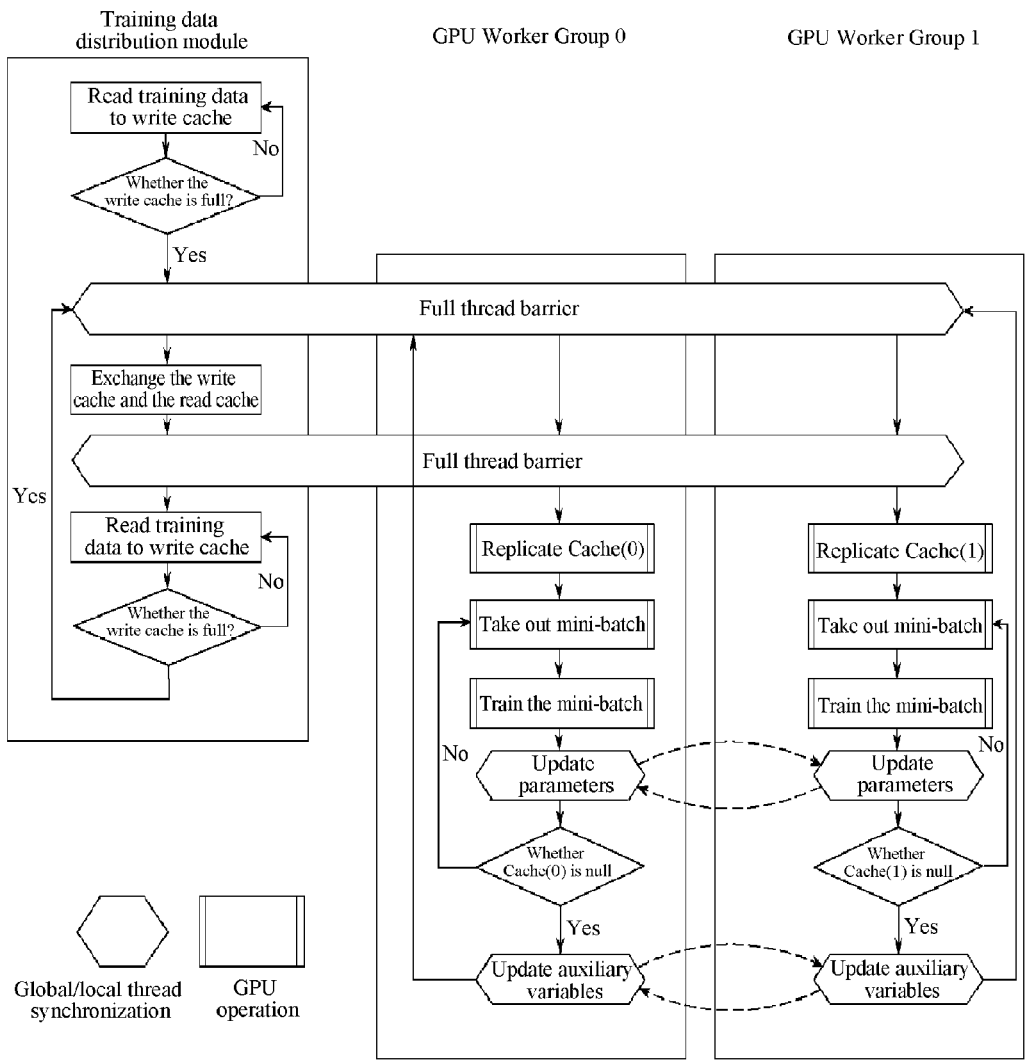
FIG. 5 is a flowchart of control over a data processing method according to one embodiment of the present invention.

The whole training process is as shown in FIG. 5. Firstly, batch files are read from a flash memory, a magnetic disk, a solid-state memory and other nonvolatile memories, and data is written into a cache region opened up in a main memory (RAM). The RAM may include two cache regions with the same size, one is configured to write data, and may be recorded as a write cache region; while the other one is configured to allow the GPU worker groups to read data, and may be recorded as a read cache region. The size of the cache region is relevant to the number of the GPU worker groups. If a storage space occupied by a storage structure for storing a GPU worker group is M, the size of the cache region is the number of the GPU worker groups*M. Whether the write cache is full is judged each time one batch of files are written, and if yes, proceed to the flow in the next stage. In a period of writing data to the write cache, all CPU threads bound to the GPU worker groups are in a full-thread barrier state, to wait for completion of reading of the data.

If the write cache is full, the write cache region and the read cache region in the RAM are exchanged. It may be understood that, during exchange of the cache regions, all CPU threads bound to the GPU worker groups are in a full-thread barrier state, to wait for completion of exchange of the cache regions.

After completion of exchange, the data reading process in the CPU and the data training process in the GPUs are performed in parallel. In the CPU, reading of next batch of training data begins from the nonvolatile memory to the write cache. It should be noted that, although it is also the write cache, the specific storage region of the write cache in the RAM is different from the previous one as exchange of the cache regions has been performed in the previous flow.

At the same time, the specific data training process begins in the GPUs, a pointer to a storage structure of a corresponding batch of data may be transferred to a corresponding worker group, and the worker group reads corresponding data from the read cache to a video memory. For example, in NVIDA's CUDA, data in the read cache region in the RAM is replicated to the corresponding GPU through cudaMemcpyHostToDevice calling. It may be understood that, different GPUs may replicate data in different regions in the read cache. For example, GPU0 reads Cache(0), while GPU1 reads data of Cache(1).

After the data is replicated to the video memory, the GPU takes out the mini-batch data each time, to perform mini-batch training, a gradient $\Delta w$ is obtained according to a result of the mini-batch training, a model parameter is updated according to the gradient $\Delta w$, the gradient $\Delta w$ is synchronized to models in other GPUs, gradients synchronized from the other GPUs are received at the same time, and the model parameter is updated once again; in this way, the plurality of GPUs in the parallel training all has the latest model parameter.

After parameter updating is completed, whether the training data has been completely processed is judged, and if no, next mini-batch training data is continuously acquired for training. Otherwise, the learning rate is updated according to the model parameter. Similar to the gradient, it is also necessary to synchronize the learning rate variation gradient of the GPU to other GPUs and update auxiliary variables according to learning rate variation gradients synchronized from the other GPUs.

After the operation of updating auxiliary variables is completed, the full thread barrier state is re-entered, to wait for all other GPUs to complete the training and completion of the data reading operation in the CPU.

The foregoing process is repeated, and the model training process can be completed.

Figure 6:
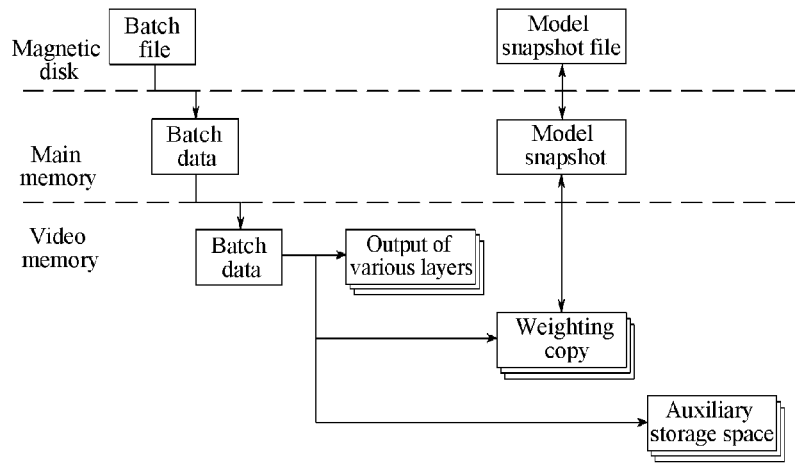
FIG. 6 is a schematic diagram showing that data is accessed between different memories in a data processing method according to one embodiment of the present invention.

In the whole training process, a data storage organization is as shown in FIG. 6. The training data is stored in a magnetic disk in a form of batch files, and each file stores one batch of image data. During running, the training data distribution module 124 reads a plurality of batches of files each time, the number of the batches being a total number (Worker_Group_Number) of worker groups.

The files read are firstly stored on the main memory and a pointer to a storage structure of a corresponding batch of data is transferred to a corresponding worker group, when the training begins, each worker group replicates the data on the main memory to a video memory of a corresponding GPU (e.g., through cudaMemcpyHostToDevice calling in NVIDA's CUDA), mini-batch is taken out in sequence from the training data as mini-batch data, and in forward and backward training, output of various layers, weighting copies, auxiliary spaces and other data are stored in the video memory. Corresponding storage spaces are also opened up on main memories of weighting copies of all convolutional layers and fully connected layers, and each time a write model snapshot is reached, the write model snapshot is replicated back to the host memory (e.g., through cudaMemcpyHostToDevice calling in the CUDA) from the video memory of the GPU, to fall to the ground as a magnetic file, and become a snapshot file of a real-time model.

Based on the mini-batch training, in the solution of the existing technology, when a CNN is trained, one batch of data is read and processed each time, and the CPU pre-reads and pre-processes next batch when GPUs compute a certain batch.

With increase of the number of training set image pixels, the reading and processing time increases accordingly; the solution of the embodiment uses a multi-GPU technology to reduce computing time of a single batch, and a performance bottleneck problem of data processing in the CPU follows, therefore, it is necessary to reduce used time of training data reading and training data pre-processing in the CPU, to cause the final accelerating effect to depend on computing time.

Therefore, in the aspect of reading the training data, a separate CPU thread can be used as an I/O thread to read data; in the aspect of processing the training data, a thread pool is used to make full use of all the remaining CPU resources for pre-processing the training data. Overall, a triple parallel flow line is performed all the time during the CNN training of this embodiment: computing the current batch of data (completed by the GPUs), pre-processing next batch of data (completed by the thread pool on the CPU), and reading next batch of data (completed by the I/O thread).

Figure 7:
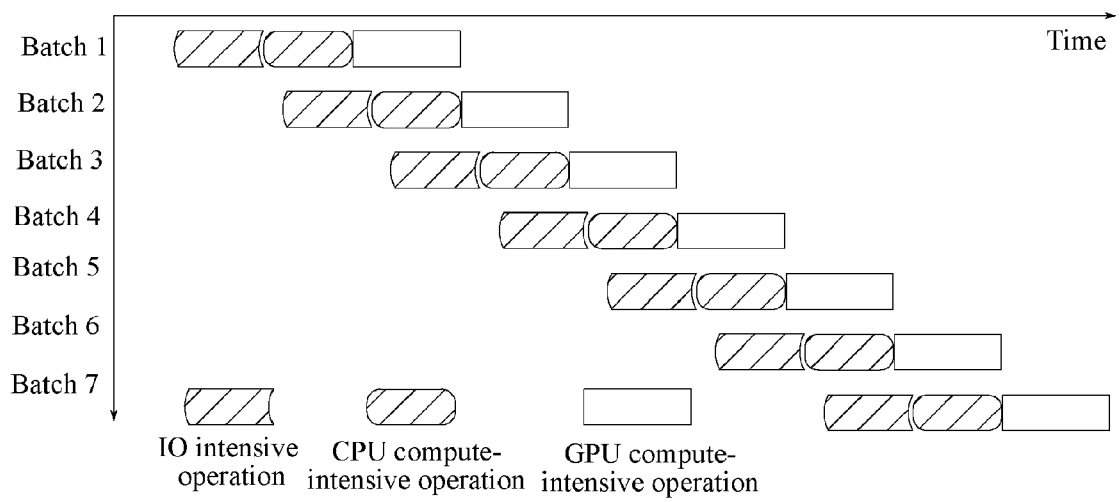
FIG. 7 is a schematic diagram of run-time utilization efficiency of a data processing method according to one embodiment of the present invention.

Referring to FIG. 7, except that reading batch data and processing batch data need to spend extra initialization time at the beginning of the training process, in the processing process of all the remaining batches of data, data processing in the GPUs and data reading and processing in the CPU are completed in parallel, and it is unnecessary to wait for CPU reading data and processing results between data processing between different batches in the GPUs, therefore, parallel computing capability of the GPUs is fully used, thereby enhancing the training efficiency.

When a mini-batch based stochastic gradient descent algorithm is used, each time computing of one mini-batch completed, it is necessary to apply a gradient (marked as Δw in the figure) obtained through the current computing to a corresponding parameter (marked as w in the figure), and a simple parameter updating formula is:

$$weight_{i+1} = weight_i - \epsilon * \left(\frac{\partial L}{\partial w}\bigg|w_i\right)$$

in the formula, i denotes the number of times a parameter is updated, weight represents a certain parameter, ε denotes a learning rate, and $$\left(\frac{\partial L}{\partial w}\bigg|w_i\right)$$

denotes the gradient computed by the current back-propagation algorithm, i.e., Δw.

Figure 8:
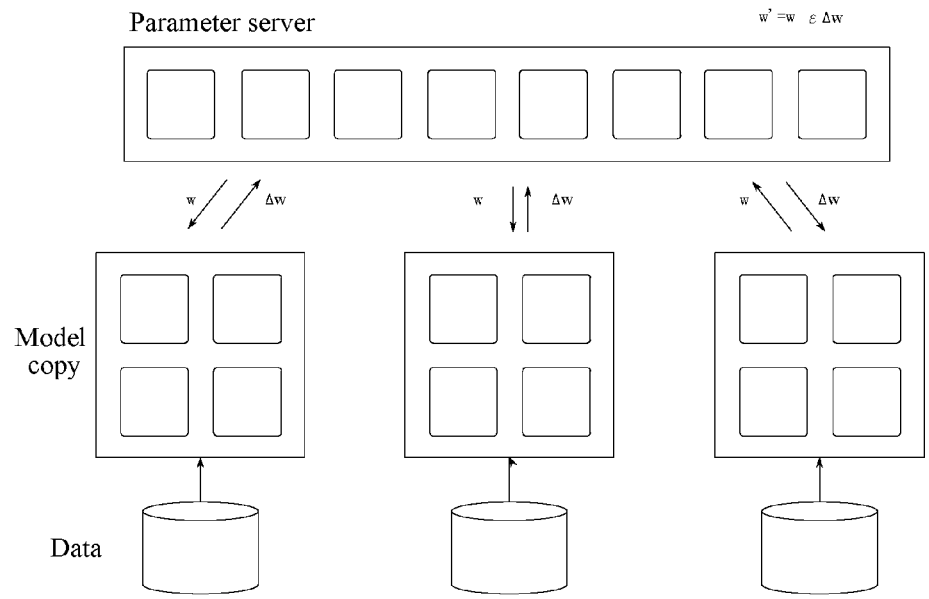
FIG. 8 is a schematic diagram of gradient and parameter updating during training of a convolutional neural network (CNN) model.

Referring to FIG. 8, in data parallel implementation, the bottleneck affecting the performance is parameter exchange between multiple GPUs. This is because it is necessary to exchange gradients of all model copies to a parameter server and update the gradients to corresponding parameters according to the parameter updating formula, and this looks like a serial operation, which destroys consistent parallelism in data parallel implementation, as shown in FIG. 4. It should be noted that, the parameter server herein may be a server configured to update parameters connected with the server 100 through a network, and may also be the server 100 per se, that is to say, the server 100 has a synchronization module configured to synchronize parameters between different GPUs.

In one implementation, in order to solve the problem that the parameter synchronization efficiency between different GPUs is lower, an intuitive idea is relying on peer-to-peer data transmission between multiple GPUs, that is, a data transmission connection is established between each two GPUs, to exchange respective Δw. However, the performance enhanced by such a solution is limited, which mainly lies in that the Δw can be updated to parameter models of all the GPUs only by transmitting the Δw computed on any GPU on the PCIe bus multiple times, which excessively occupies and consumes bandwidth of the PCIe bus. Moreover, with increase of the number of the GPUs, the exchange time increases exponentially.

In order to further enhance the parameter exchange efficiency, this embodiment of the present invention designs a linear topological manner of parameter exchange for a multi-GPU scenario: a storage model parameter matrix and a storage gradient matrix are equally divided into partitions spatially, the number of partitions depends on the number of data parallel groups (i.e., the total number of worker groups) and is half thereof, this is in consideration of making full use of communication efficiency between GPUs, and because GPU communication is peer to peer and two GPUs participate into one communication, the number of the groups is the total number of worker groups (i.e., the total number of the GPUs for a single-GPU worker group)/2.

Figure 9:
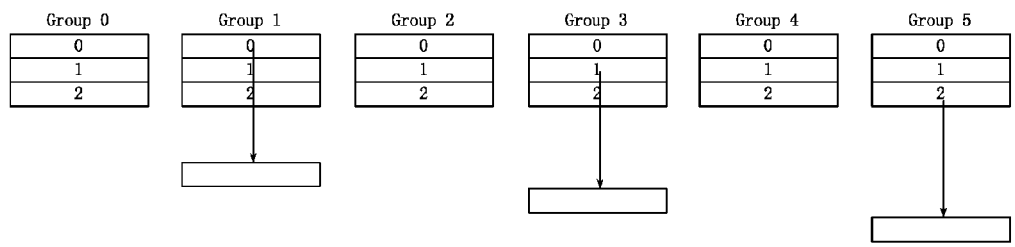
FIGS. 9-11 are schematic diagrams of parameter exchange in a data processing method according to one embodiment of the present invention.

Referring to FIG. 9, in one implementation, the number of parallel worker groups is 6, and their sequence numbers are respectively 0, 1, 2, 3, 4 and 5. Each worker group has 3 (6/2) partitions, and sequence numbers of the partitions are respectively 0, 1 and 2. For a worker group whose sequence number is k (k is an odd number), the worker group is labeled as an owner of a partition whose sequence number is (k−1)/2. For example, Group 1 is the owner of Partition 0, Group 2 is the owner of Partition 1, while Group 5 is the owner of Partition 2. The meaning of labeling one worker group as the owner of a certain partition lies in that, after the parameter exchange process of this embodiment, a parameter in the partition of the worker group is a complete result of synchronizing parameters in all other worker groups. It may be understood that it is only illustrative herein to select a worker group whose sequence number is an odd number, for example, a worker group whose sequence number is an even number may also be selected as an owner of a partition, and, certainly, the subsequent process needs to change correspondingly.

The parameter exchange process of this embodiment includes a plurality of cycles. Specifically, the number of the cycles is the number of the parallel data groups −1. In the architecture shown in FIG. 9, the number of the parallel data groups is 6, and thus the number of the cycles is 5. Within each cycle, data of all the partitions is pushed once from an upstream worker group to a downstream worker group, and the pushing process includes two operations, i.e., replicating the data of the partitions from the upstream worker group and combining the data locally. It may be understood that the upstream worker group and the downstream worker group herein are defined arbitrarily. In one implementation, the worker groups are sorted according to a size order of IDs, and two worker groups with the greatest and smallest IDs are defined as adjacent worker groups, so as to form a cyclic structure between the worker groups. According to a specified direction, an upstream worker group and a downstream worker group of a certain task can be determined. For example, Group 0 is an upstream worker group of Group 1, and conversely, Group 1 is a downstream worker group of Group 0. For Group 0, Group 5 serves as an upstream worker group thereof, and for Group 5, Group 0 serves as a downstream worker group thereof.

On the whole, the pushing data of all the partitions once from an upstream worker group to a downstream worker group may specifically include the following operations: within a cycle where the sequence number is k (k is an integer and 1≤k≤2N−1), replicating a preset partition in the N partitions from a GPU whose sequence number is i to a GPU whose sequence number is j, and merging the gradients, wherein i=(2m+k+1)% N, j=(2m+k+2)% N, m is an integer and 0≤m≤N−1. It may be understood that the formula herein is merely reckoned for a given sequence number, but a person of ordinary skill in the art may use any other equivalent formula to replace it, as long as their values are the same, or even the values have the same regularity.

Figure 10:
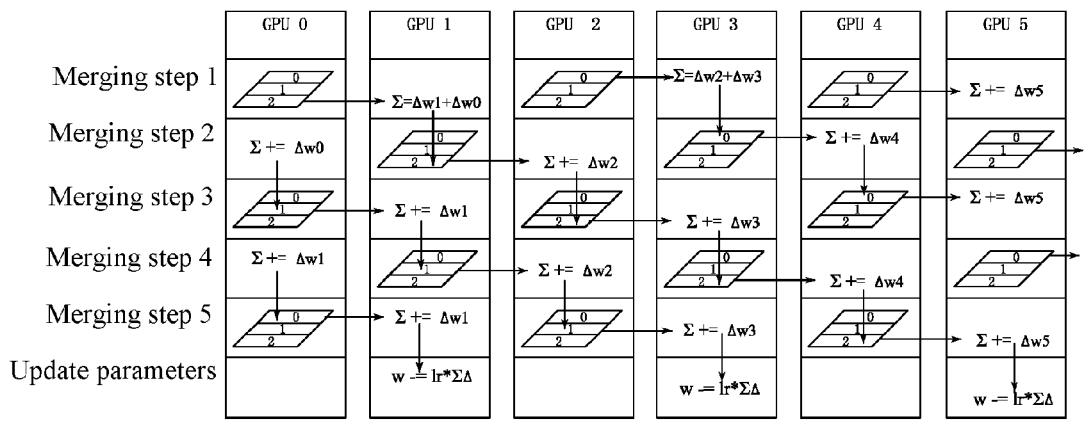

It should be noted that, within each cycle, not each GPU will receive data of other GPUs. Referring to FIG. 10, within a first cycle (merging step 1), data of all partitions in GPU 0 is replicated to GPU 1, data of all partitions in GPU 2 will be replicated into GPU 3, while data of all partitions in GPU 4 will be replicated into GPU 5. It may be understood that, GPUs 0, 2 and 4 are only data providers within the first cycle, but will not receive data of other GPUs. After the data is replicated, a step of data merging is performed, that is, gradients $\Delta w$ obtained through computing of two models are added, for GPU 1, $\Sigma=\Delta w1+\Delta w0$, for GPU 3, $\Sigma=\Delta w2+\Delta w3$; for GPU 5, $\Sigma=\Delta w4+\Delta w5$. That is to say, after the first cycle, the data in GPU 0 and GPU 1 has been merged in GPU 1, the data in GPU 2 and GPU 3 has been merged in GPU 3, and the data in GPU 4 and GPU 5 has been merged in GPU 5.

Within a second cycle (merging step 2), data of all partitions in GPU 5 will be replicated into GPU 0, data of all partitions in GPU 1 will be replicated into GPU 2, while data of all partitions in GPU 3 will be replicated into GPU 4. It may be understood that, GPUs 5, 1 and 3 are only data providers within the second cycle, but will not receive data of other GPUs. After the data is replicated, a step of data merging is performed, that is, gradients $\Delta w$ obtained through computing of two models are added, for GPU 0, in Partition 1, $\Sigma=\Delta w4+\Delta w5+\Delta w0$; for GPU 2, in Partition 2, $\Sigma=\Delta w0+\Delta w1+\Delta w2$; and for GPU 4, in Partition 0, $\Sigma=\Delta w2+\Delta w3+\Delta w4$. That is to say, after the second cycle, the data in the GPUs 0, 4 and 5 has been merged in Partition 1 of GPU 0, the data in the GPUs 0, 1 and 2 has been merged in Partition 2 of GPU 2, and the data in the GPUs 2, 3 and 4 has been merged in Partition 0 of GPU 4.

Within a third cycle (merging step 3), the data replication process is the same as that in the first cycle, and after the step of data merging is performed, for Partition 1 of GPU 1, $\Sigma=\Delta w4+\Delta w5+\Delta w0+\Delta w1$; for Partition 2 of GPU 3, $\Sigma=\Delta w0+\Delta w1+\Delta w2+\Delta w3$; and for Partition 0 of GPU 5, $\Sigma=\Delta w2+\Delta w3+\Delta w4+\Delta w5$. That is to say, after the third cycle, the data in the GPUs 0, 1, 4 and 5 has been merged in Partition 1 of GPU 1, the data in the GPUs 0, 1, 2 and 3 has been merged in Partition 2 of GPU 3, and the data in the GPUs 2, 3, 4 and 5 has been merged in Partition 0 of GPU 5.

Within a fourth cycle (merging step 4), the data replication process is the same as that in the second cycle, and after the step of data merging is performed, for Partition 0 of GPU 0, $\Sigma=\Delta w2+\Delta w3+\Delta w4+\Delta w5+\Delta w0$; for Partition 1 of GPU 2, $\Sigma=\Delta w4+\Delta w5+\Delta w0+\Delta w1+\Delta w2$, and for Partition 2 of GPU 4, $\Sigma=\Delta w0+\Delta w1+\Delta w2+\Delta w3+\Delta w4$. That is to say, after the fourth cycle, the data in the GPUs 2, 3, 4, 5 and 0 has been merged in Partition 0 of GPU 0, the data in the GPUs 4, 5, 0, 1 and 2 has been merged in Partition 1 of GPU 2, and the data in the GPUs 0, 1, 2, 3 and 4 has been merged in Partition 2 of GPU 4.

Within a fifth cycle (merging step 5), the data replication process is the same as that in the first cycle, and after the step of data merging is performed, for Partition 0 of GPU 1, $\Sigma=\Delta w2+\Delta w3+\Delta w4+\Delta w5+\Delta w0+\Delta w1$; for Partition 1 of GPU 3, $\Sigma=\Delta w4+\Delta w5+\Delta w0+\Delta w1+\Delta w2+\Delta w3$; and for Partition 2 of GPU 5, $\Sigma=\Delta w0+\Delta w1+\Delta w2+\Delta w3+\Delta w4+\Delta w5$. That is to say, after the third cycle, the data in the GPUs 0-5 has been merged in Partition 0 of GPU 1, the data in the GPUs 0-5 has been merged in Partition 1 of GPU 3, and the data in the GPUs 0-5 has been merged in Partition 2 of GPU 5.

After the process of five cycles, the partition corresponding to the owner of each partition includes gradient data which merges model data in all GPUs, and then, in the step of updating parameters, parameters in the partitions corresponding to the owners can be updated respectively. For example, for the owner of Partition 0, the parameter in Partition 0 in GPU 1 is updated; for the owner of Partition 10, the parameter in Partition 1 in GPU 3 is updated; and for the owner of Partition 2, the parameter in Partition 2 in GPU 4 is updated.

It may be understood that after the steps, each owner holds the latest model parameter of a certain partition, and thus it is necessary to distribute the latest model parameter to each GPU. Reference can be made to the merge process of parameter exchange for the distribution process of model parameters, and within the cycle where the sequence number is k, a preset partition in the N partitions is replicated from a GPU whose sequence number is a to a GPU whose sequence number is b, wherein a=(2m+k) % N, and b=(2m+k+1)% N.

Figure 11:
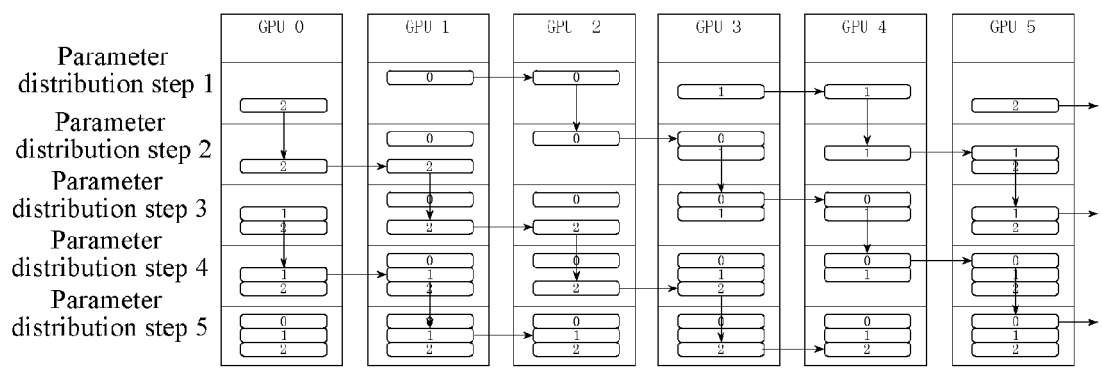

Referring to FIG. 11, in the parameter distribution step 1, the data in Partition 0 of GPU 1 is replicated to GPU 2, the data in Partition 1 of GPU 3 is replicated to GPU 4, and the data in Partition 2 of GPU 5 is replicated to GPU 0. In the parameter distribution step 2, the data in Partition 2 of GPU 0 is replicated to GPU 1, the data in Partition 0 of GPU 2 is replicated to GPU 3, and the data in Partition 1 of GPU 4 is replicated to GPU 5. In the parameter distribution step 3, the data in Partition 2 of GPU 1 is replicated to GPU 2, the data in Partition 0 of GPU 3 is replicated to GPU 4, and the data in Partition 1 of GPU 5 is replicated to GPU 0. In the parameter distribution step 4, the data in Partition 1 of GPU 0 is replicated to GPU 1, the data in Partition 2 of GPU 2 is replicated to GPU 3, and the data in Partition 0 of GPU 4 is replicated to GPU 5. In the parameter distribution step 5, the data in Partition 1 of GPU 1 is replicated to GPU 2, the data in Partition 2 of GPU 3 is replicated to GPU 4, and the data in Partition 0 of GPU 5 is replicated to GPU 0. After the steps, all the GPUs have the latest model parameter.

The bandwidth of the PCIe bus is fixed (set as W), the division number of the data parallel groups is 2N, the model size is M, in a scene where peer-to-peer population parameter exchange is adopted, each two data parallel groups need to perform peer-to-peer data exchange, therefore, the shortest cycle of data transmission is 2*(2N−1) times, the amount of data transmitted on the bus each time is M, and thus it is deduced that used time of parameter exchange is 2*(2N−1)*(M/W).

According to the linear topological solution in this embodiment, 1/N corresponding to the whole model parameter is maintained on each worker group (GPU) whose group number is an odd number (1, 3, 5, . . . ), according to a linear topology, only (1/N)*M of the amount of data is transmitted in single data exchange, a parameter merging cycle is 2N−1, a parameter distribution cycle is also 2N−1, and thus it is deduced that used time of parameter exchange is 2*(2N−1)*(M/(N*W)), which is only 1/N (N=1, 2, 3, . . . ) of peer-to-peer time. So, the greater the concurrency value of data parallel is, the more significant the performance benefit of the linear topology is; please refer to Table 2 for more specific data.

TABLE 2

Performance analysis of linear topology

| The number of groups | Bandwidth | Model total size | Model replication time | The number of model slices | The number of collection (pushing) cycles | Used time of collection (pushing) communication | Used time of single parameter exchange communication |
|---|---|---|---|---|---|---|---|
| N | BW | MS | T0 = MS/BW | N/2 | N-1 | $2T0\left(\frac{n-1}{n}\right)$ | $4T0\left(\frac{n-1}{n}\right)$ |
| 2 | 6.6 GB/s | 186 MB | 28.2 ms | 1 | 1 | 28.2 ms | 56.4 ms |
| 4 | | | 28.2 ms | 2 | 3 | 42.3 ms | 84.6 ms |
| 6 | 4.5 GB/s | | 41.3 ms | 3 | 5 | 68.8 ms | 137.7 ms |
| 8 | | | 41.3 ms | 4 | 7 | 72.3 ms | 144.6 ms |
| ... | ... | ... | ... | ... | ... | ... | ... |

The linear topology can be easily expanded to parameter exchange of an even number of data parallel groups, and its collection (pushing) time slowly increases with increase of the number of data parallel groups, and has an upper limit-2T0, which indicates that the linear topology is very suitable for more GPUs to perform data parallel.

In the training flow shown in FIG. 5, an auxiliary variable is further updated, In one implementation, the auxiliary variable is the sum of squares of auxiliary gradients (helper_sum) used for computing an adaptive learning rate, and a computational formula thereof is as follows:

$$\text{helper\_sum}'_i = \text{helper\_sum}_i + \Delta w_i^2$$

where i is the sequence number of a worker group or GPU.

The sum of squares of auxiliary gradients is used for computing an adaptive learning rate, and a computational formula of the adaptive learning rate is as follows:

$$\text{learning\_rate}_i = \text{aggregating\_rate} * \frac{\text{adagrad\_rho}}{\text{adagrad\_rho} + \sqrt{\text{helper\_sum}'_i}}$$

where aggregating_rate is an aggregating learning rate, and in an initial state, it is a pre-configured constant; adagrad_rho is an auxiliary quantity used for computing the adaptive learning rate, and is another pre-configured constant.

In a scene of data parallel, the cross-group updating rule of helper_sum is exactly the same as the pushing stage in the data parallel parameter exchange process, as a gradient is a complete cumulative result first held on a partition owner and can be applied to parameters according to an adaptive gradient (Adagrad) parameter updating formula, but at this point, only helper_sum on the partition owner is used, therefore, it is feasible to only hold the latest helper_sum of all partitions held on the partition owner, and other partition owners need to zero out helper_sum after the pushing, to be available for computing re-accumulation. As helper_sum does not require distribution, the process of exchanging helper_sum can be completed only through one pushing stage.

Therefore, in the scene of data parallel, an adaptive learning rate updating formula for the parameter in the ith position should be expressed as:

$$\text{helper\_sum\_part}_{ij}^r = \text{helper\_sum\_part}_{ij} + \Delta w_{ij}^2$$

(for all the partitions)

$$\text{helper\_sum}'_i = \sum_{j=0}^{GROUP\_NUM} \text{helper\_sum\_part}'_{ij}$$

(only applied to partition owners)

$$\text{learning\_rate}_i = \text{aggregating\_rate} * \frac{\text{adagrad\_rho}}{\text{adagrad\_rho} + \sqrt{\text{helper\_sum}'_i}}$$

(only applied to partition owners)

$$\text{helper\_sum\_part}_{ij}^r = 0$$

(only for non-partition owners)

An actual application scenario in combination with an Adagrad algorithm: accumulation of helper_sum is actually a quantization process for adjusting each learning rate, which has certain approximation. Based on performance considerations, an approximate helper_sum is used for collection in an actual project: local accumulation helper_sum computing is carried out on all the partitions after each mini-batch ends, and after M (generally set as 8) mini-batches end, the mini-batches are pushed to the corresponding partition owners to complete ultimate accumulation. This gives consideration to both algorithm effects and training performance.

Figure 12:
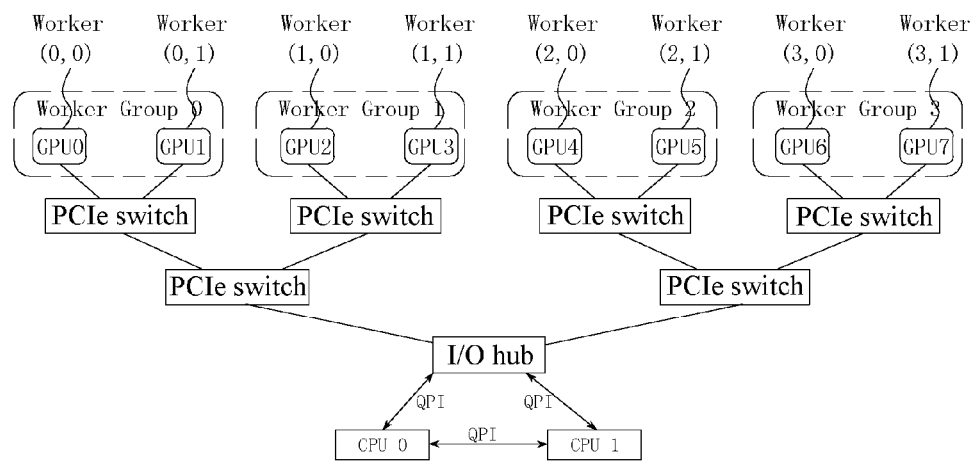
FIG. 12 is a schematic diagram of division of worker groups in a data processing method according to one embodiment of the present invention.

Referring to FIG. 12, in a scene where data parallel and model parallel are used at the same time, each GPU is bound to one worker, and two adjacent GPUs make up one worker group, that is, parallel training configuration where four channels of data are parallel and two GPU models in the group are parallel is formed. In the architecture shown in FIG. 12, one GPU in each worker group is responsible for one part of the training model, while the other GPU is responsible for the other part of the training model, and each GPU corresponds to one worker.

Figure 13:
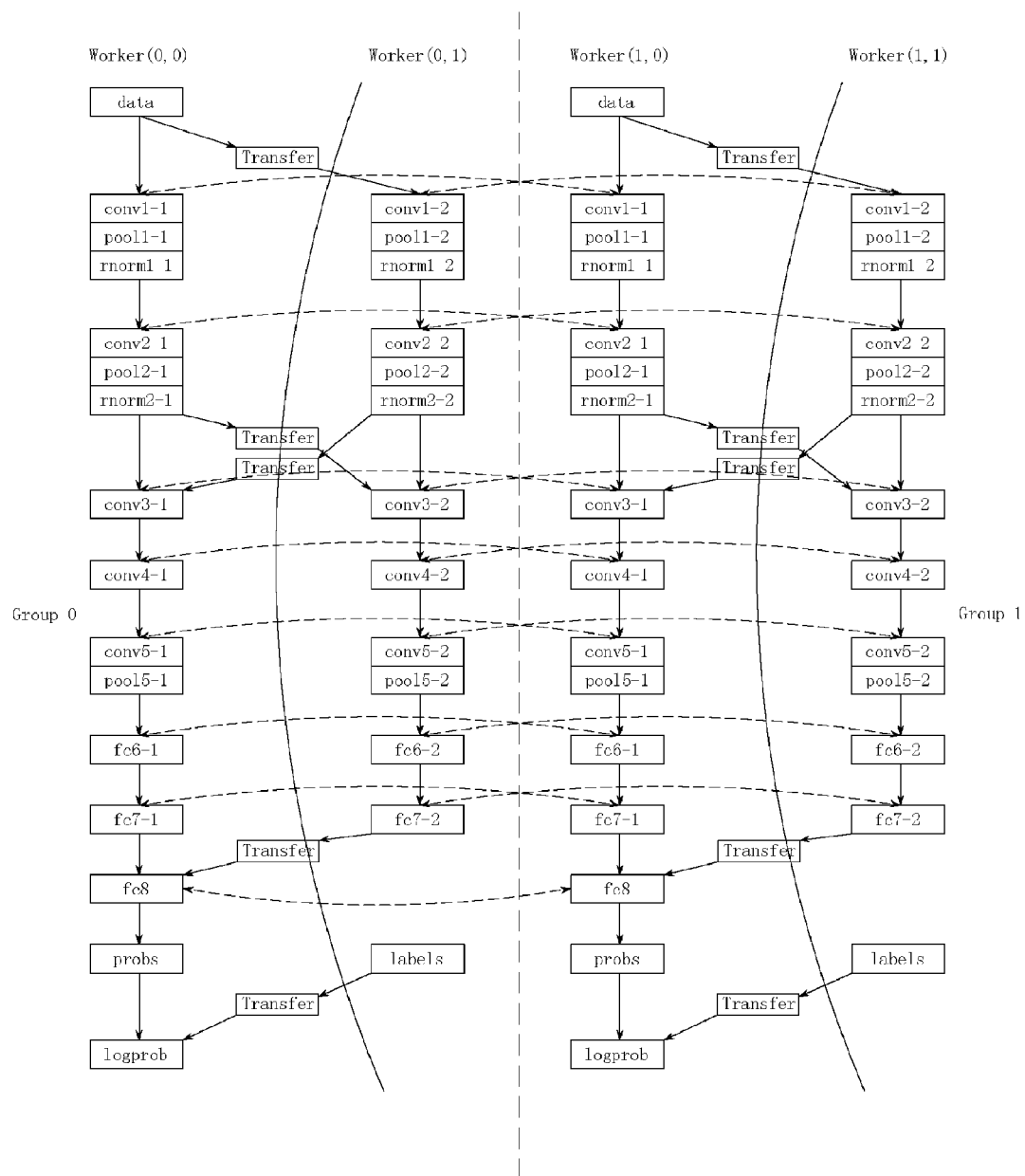
FIG. 13 is a schematic diagram of a multi-level model of a CNN model.

Referring to FIG. 13, FIG. 13 is a schematic diagram of training of a parallel CNN where two channels of data are parallel and two GPU models in the group are parallel. The whole training process is divided into multiple layers, wherein data denotes a Data Layer, convX-Y denotes Part Y of the Xth Convolutional Layer, poolX-Y denotes Part Y of the xth Pooling Layer, rnormX-Y denotes Part Y of the Xth output Normalization Layer, fcX-Y denotes Part Y of the Fully Connected Layer, probs denotes a Probability Predication Layer, logprob denotes a log-probability layer, and labs denotes a data Labeling Layer.

Figure 14:
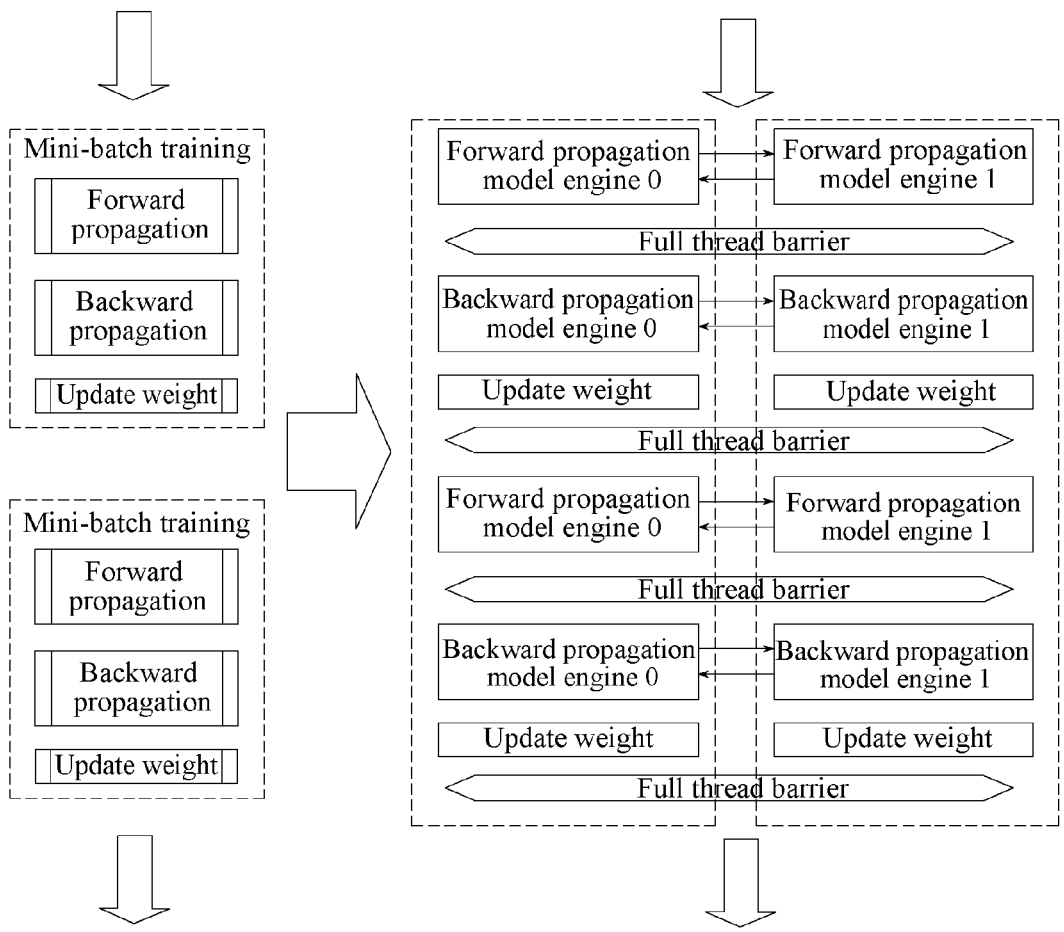
FIG. 14 is a schematic diagram of comparison of single-GPU single-model data processing and multi-GPU single-model data processing.

As shown in FIG. 14, differences between single-GPU training and multi-GPU model parallel training mainly lie in: in a scene where a single GPU is used for training, the model is not split, and the whole model is stored on a GPU video memory; in a scene of model parallel, the model is split and stored to a plurality of GPUs, therefore, in the training process, each GPU actually only trains one part of the model, and training of the whole model is completed by scheduling one worker group by an execution engine.

Therefore, in the flow shown in FIG. 13, for the intra-group multi-GPU model parallel training manner, the parameter exchange is only performed between correspondingly parts. For example, Worker(0,0) and Worker(1,0) exchange parameters therebetween, while Worker(0,1) and Worker(1,1) exchange parameters therebetween. That is to say, for the same model parts, the parameter exchange can be performed respectively according to the flows shown in FIG. 10 and FIG. 11. After each model part completes the parameter exchange, the model of each worker group is the latest complete model.

Figure 16:
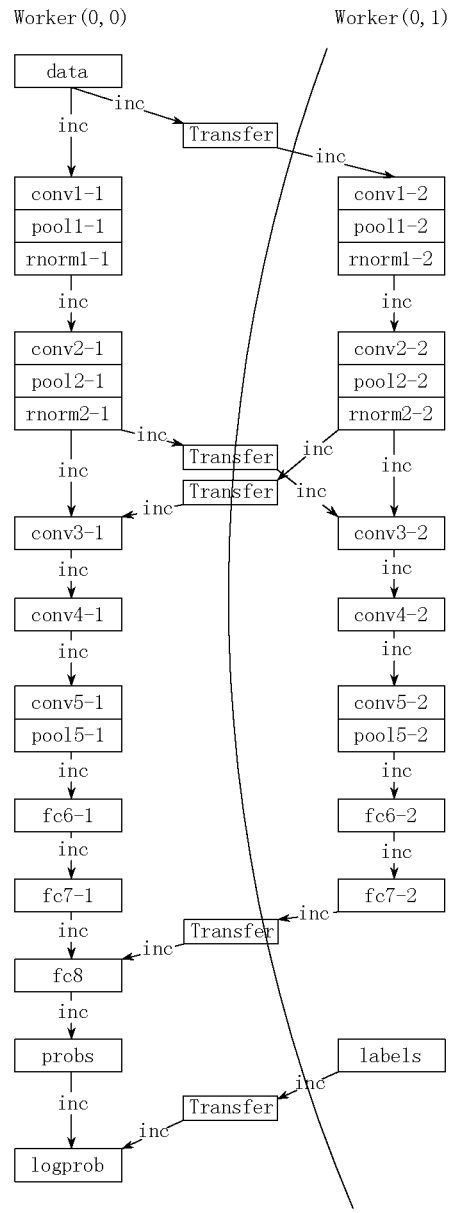
FIG. 16 is a schematic diagram of a multi-level model of a CNN model.

Referring to FIG. 16, a CNN is fully connected with other layers only at a particular layer (e.g., the Data Layer and the Fully Connected Layer), while other independent linear connection relationships can serve as a parallel part of the model. The parallel part of the model is split onto a plurality of GPUs, and computing capability of the plurality of GPUs is used to perform computing of sub-models, which can greatly speed up single forward-backward training time of the model. The inc in FIG. 16 denotes waiting of a lower layer for an upper layer, that is, the result of training of the previous layer serves as input of next layer. For example, conv1-1 requires waiting for a data access layer to complete data preparation.

A CNN network hierarchical model is actually a set of layers of a Directed Acyclic Graph (DAG) assigned to each model parallel worker, and is a DAG topological sorting subset, and all subsets make up one group of models of the whole network.

The topological sorting set of the whole network:
{data, labels, conv1-1, conv1-2, pool1-1, pool1-2, rnorm1-1, rnorm1-2, conv2-1, conv2-2, pool2-1, pool2-2, rnorm2-1, rnorm2-2, conv3-1, conv3-2, conv4-1, conv4-2, conv5-1, conv5-2, pool5-1, pool5-2, fc6-1, fc6-2, fc7-1, fc7-2, fc8, probs, logprob}

The topological sorting subset assigned to a model parallel Worker 0:
{data, conv1-1, transfer_conv1-2, pool1-1, rnorm1-1, conv2-1, pool2-1, rnorm2-1, conv3-1, transfer_conv3-2, conv4-1, conv5-1, pool5-1, fc6-1, fc7-1, fc8, probs, transfer_labels, logprob}

The topological sorting subset assigned to a model parallel Worker 1:
{labels, conv1-2, pool1-2, rnorm1-2, transfer_conv3-1, conv3-2, conv4-2, conv5-2, pool5-2, fc6-2, fc7-2, transfer_fc8}

Therefore, during computing, the model parallel workers are advanced according to an array order: positively sequenced in the event of forward propagation, negatively sequenced in the event of backward propagation, thereby meeting the requirement for a computing sequence of network sub-models. Synchronization waiting control logic between the workers is controlled by a worker group engine on each worker so as to ensure parallelism and correctness of advances in model computing.

It can be seen that, a transport layer is added automatically to a sub-model topological sorting set after splitting, which is implemented for automatic reform of a training system. When model configuration is loaded, it is identified that two adjacent layers belong to different workers, that is, a computing operation is performed on different GPUs, and when remote data replication is required, a transport layer is added automatically between two layers, which is responsible for replicating output of an upper adjacent layer to a GPU to which a lower adjacent layer is bound during forward propagation, to serve as input thereof; and is responsible for replicating errors propagated from the lower adjacent layer to a GPU to which the upper adjacent layer is bound during backward propagation, used for computing backward gradients.

Figure 17:
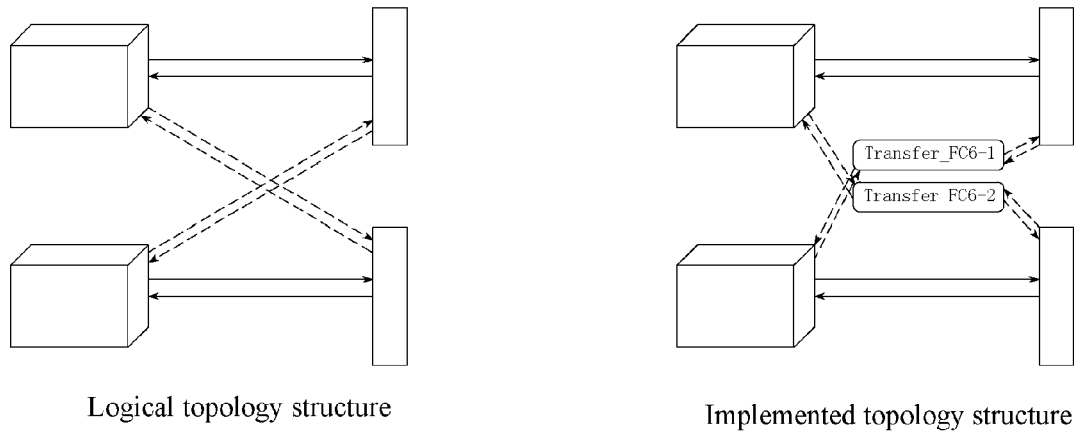
FIG. 17 is a schematic diagram of transmitting data between different GPUs in a data processing method according to one embodiment of the present invention.

Referring to FIG. 17, FIG. 17 is a schematic diagram of data transfer between two adjacent layers in two CNN multi-layer models. The solid line denotes forward or backward propagation in the same GPU, while the dotted lines denote cross-GPU forward or backward propagation. It may be understood that, a transport layer is added for cross-GPU forward propagation and background as transition, which is responsible for transferring data between two GPUs.

As stated above, the synchronization waiting control logic between the workers is controlled by a worker group engine on each worker. Specifically, the execution engine of each worker includes the following control logic.

When mini-batch training begins, an execution engine of each GPU starts at the same time.

The execution engine judges whether each layer in a sub-model held by the worker (GPU) meets the requirement for executing forward propagation or backward propagation, and if yes, executes the forward propagation or backward propagation.

After execution of forward computing of a certain layer ends, the execution engine is responsible for activating forward computing of a posterior adjacent layer. For example, after execution of the Pooling Layer pool5-1 ends, the Fully Connected Layer fc6-1 is activated.

After execution of back computing of a certain layer ends, the execution engine is responsible for activating back computing of a previous adjacent layer.

Finally, sub-models on all the workers complete forward and back computing, after parameter updating is completed for the sub-models respectively, a main thread synchronization point is reached, and next mini-batch training begins.

More specifically, for the execution engine of the worker X, the following logic is executed respectively:

Forward computing control logic: when there is a layer for which forward playback computing has not been completed, execution of forward propagation computing is attempted for all layers, to check whether to execute concatenation of flag variables.

The above logic is described as follows with pseudo-codes:

---

Worker-Fprop : Worker X (a CPU thread X binding to GPU X) {
While there is a layer for which Forward-Propagate has not been completed:
For layer in all layers in the worker:
Execution of Forward-Propagate is attempted for the layer
To check whether to execute concatenation of flag variables
}

---

Backward computing control logic: when there is a layer for which back computing has not been completed, whether the layer belongs to a gradient consumer (needing to use gradients) is judged for all layers, and if yes, execution of backward propagation algorithm is attempted, to detect whether execution is successfully, and concatenate flag variables.

The above logic is described as follows with pseudo-codes:

```
Worker-Bprop : Worker X (a CPU thread X binding to GPU X) {
While there is a layer for which Backward-Propagate has not been
completed:
For the layer in all layers in the worker:
If the layer is a "gradient consumer":
Execution of Backward-Propagate is attempted for the layer
To check whether concatenation of flag variables is executed successfully
}
```

Common control logic of each layer is positively computed: whether the total number of input received is equal to the number of front connection layers of this layer is judged, if yes, forward propagation of this layer is executed, and in addition, 1 is added to the number of input received by this layer and back connection layers.

The above logic is described as follows with pseudo-codes:

```
Common-Layer-Fprop: Layer Y (Layer Y on a certain Worker) {
If ReceivedFInputs== the number of front connection layers of this
layer:
Do fprop for this Layer
1 is added to the ReceivedFInputs variable of this layer
1 is added to ReceivedFInputs variables of back connection layers
respectively
}
```

Common control logic of each layer is negatively computed: whether the total number of input received is equal to the number of back connection layers of this layer is judged, if yes, backward propagation of this layer is executed, and in addition, 1 is added to the number of input received by this layer and back connection layers.

The above logic is described as follows with pseudo-codes:

```
Common-Layer-Bprop: Layer Y (Layer Y on a certain Worker) {
If ReceivedBInputs == the number of back connection layers of this
layer:
Do bprop for this Layer
1 is added to the ReceivedBInputs variable of this layer
1 is added to ReceivedBInputs variables of front connection layers
respectively
}
```

It may be understood that variable values recorded by positively computing common control logic of each layer and negatively computing common control logic of each layer can be used for synchronous control between threads.

Figure 18:
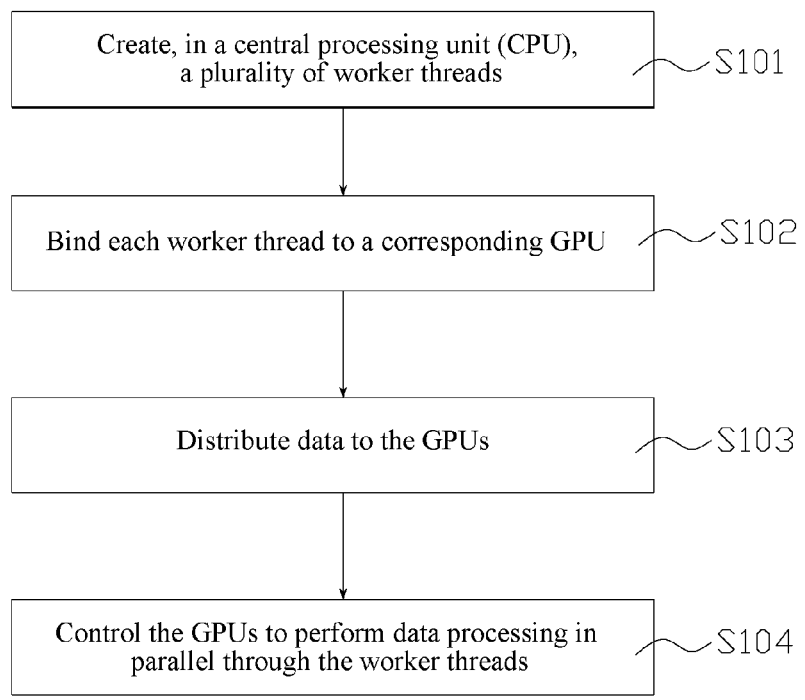
FIG. 18 is a flowchart of a data processing method according to a first embodiment.

FIG. 18 is a flowchart of a data processing method based on multiple GPUs according to a first embodiment of the present invention. The method of this embodiment includes the following steps:

Step S101. Create, in a CPU, a plurality of worker threads for controlling a plurality of worker groups respectively, the worker groups including one or more GPUs.

The number of the worker groups is the concurrency number for model parallel training. That is to say, if four channels of concurrent training are performed on the same model, four worker groups are needed. Referring to FIG. 3 and FIG. 12 respectively, each worker group may include one or more (e.g. two or more) GPUs. For each GPU in the worker group, a separate worker thread is created, the worker thread being used for executing control logic of the GPU training flow.

Step S102. Bind each worker thread to a corresponding GPU.

The binding each worker thread to a corresponding GPU refers to establishing a mapping relationship between different GPUs and worker threads. Specifically, the mapping relationship between worker threads and GPUs can be stored by storing a two-dimensional mapping table, as shown in Table 1.

Step S103. Load a plurality of batches of training data from a nonvolatile memory to GPU video memories in the plurality of worker groups.

The nonvolatile memory, for example, is a nonvolatile memory such as a magnetic disk, a flash memory, a solid-state memory or an optical disk, and original data associated with training, for example, models and each batch of data are stored in the nonvolatile memory in a form of files.

Referring to FIG. 6, in the whole training process, it is necessary to first replicate data from a nonvolatile memory to a main memory (RAM), and then it is necessary to replicate training data from the main memory to a video memory for parallel processing.

Step S104. Control the plurality of GPUs to perform data processing in parallel through the worker threads.

After the training data is replicated into the GPUs, the GPUs can process the training data to acquire a processing result. Further reference can be made to FIG. 5 for the control logic of the whole processing flow.

According to the method of this embodiment, specific processing operations are performed in a plurality of GPUs, and scheduling of each GPU is implemented by an exclusive CPU thread, therefore, in the whole data processing process, both the processing operations in the GPUs and thread scheduling in the CPU run in parallel, thereby enhancing data processing efficiency.

Figure 19:
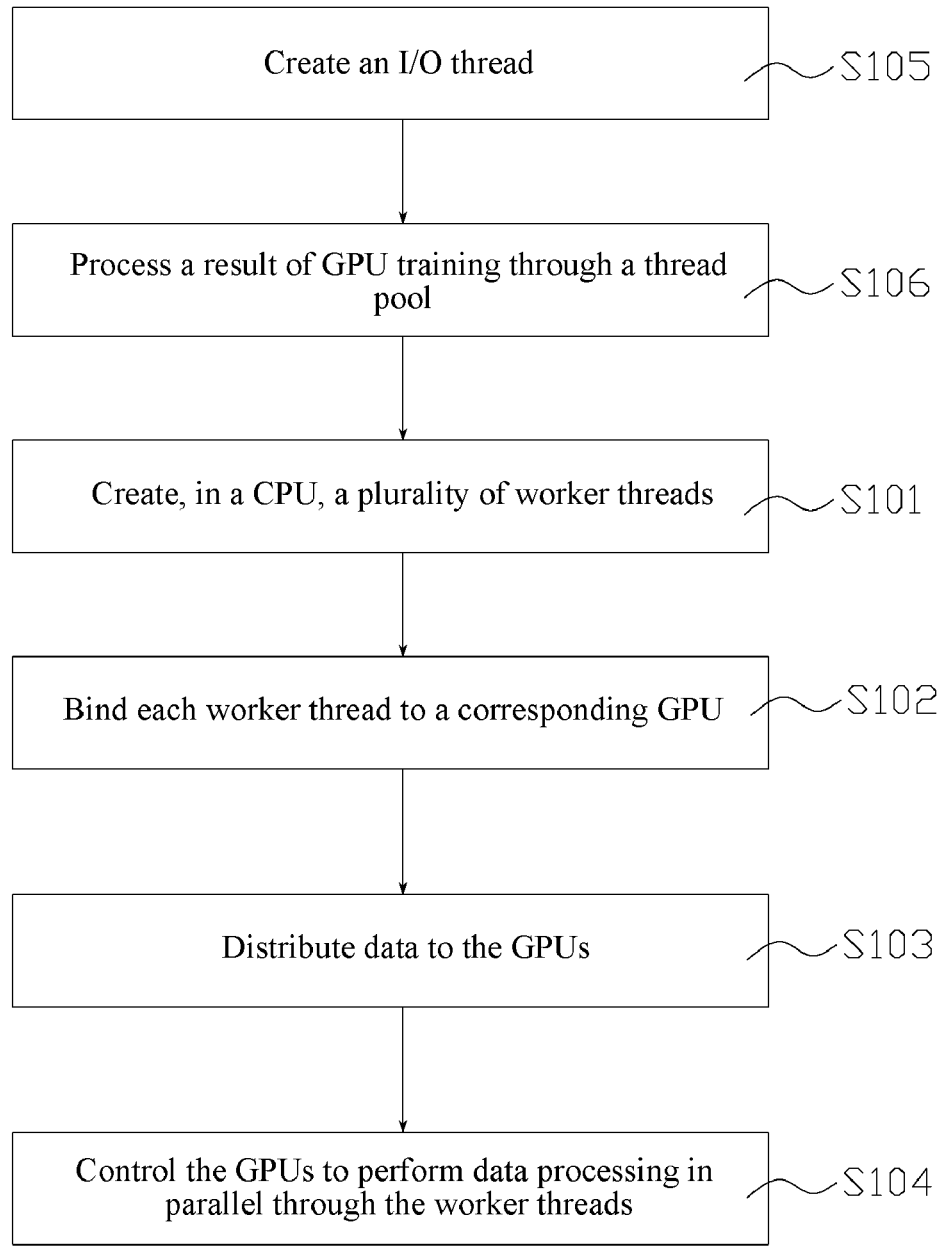
FIG. 19 is a flowchart of a data processing method according to a second embodiment.

FIG. 19 is a flowchart of a data processing method based on multiple GPUs according to a second embodiment of the present invention. The method of this embodiment is similar to the method shown in FIG. 18, and their differences are as follows:

Before step S101, the method further includes step S105: creating one I/O thread, and loading the plurality of batches of training data into a RAM through the I/O thread.

After step S105, the method further includes step S106: pre-processing the training data on the CPU through a thread pool, the I/O thread, threads in the thread pool and data processing in the GPUs being performed in parallel.

As shown in FIG. 7, by executing I/O-intensive operations and CPU compute-intensive operations in different CPU threads respectively, GPU compute-intensive operations are performed in GPUs, except that reading batch data and processing batch data need to spend extra initialization time at the beginning of the training process, in the processing process of all the remaining batches of data, data processing in the GPUs and data reading and processing in the CPU are completed in parallel, and it is unnecessary to wait for CPU reading data and processing results between data processing between different batches in the GPUs, therefore, parallel computing capability of the GPUs is fully used, thereby enhancing the training efficiency.

Figure 20:
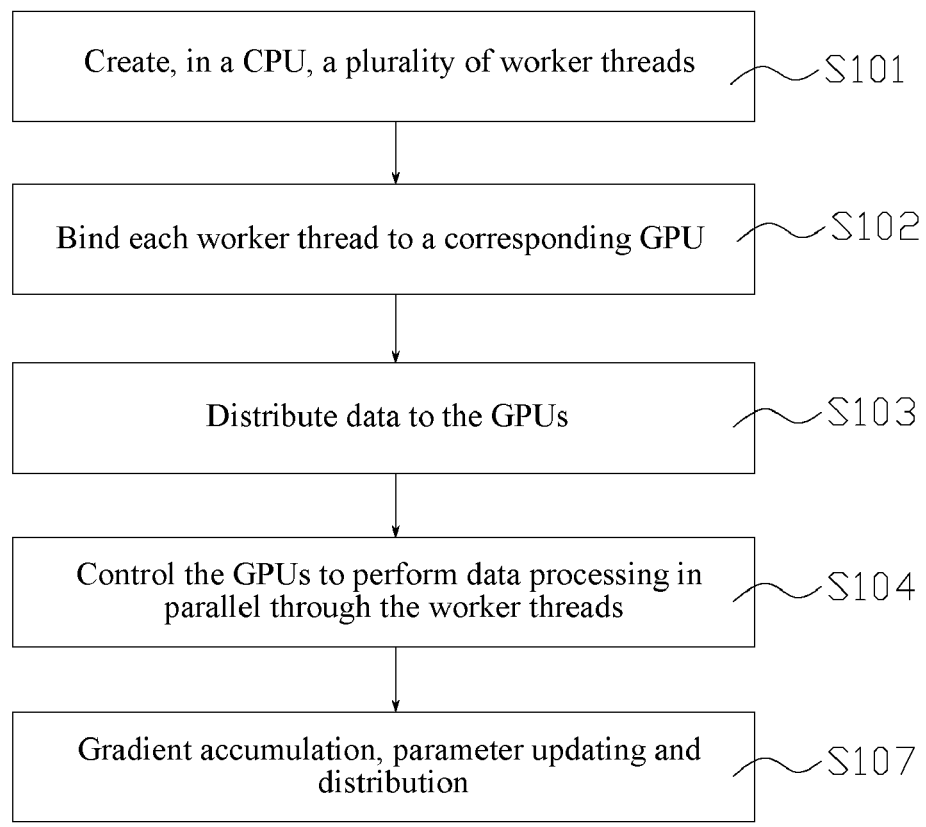
FIG. 20 is a flowchart of a data processing method according to a third embodiment.

FIG. 20 is a flowchart of a data processing method based on multiple GPUs according to a third embodiment of the present invention. The method of this embodiment is similar to the method shown in FIG. 18, and their difference is as follows: after step S104, the method further includes step S107: accumulating gradients of a plurality of GPUs holding the same model copy, updating model parameters according to the accumulated gradients, and distributing the latest model parameters to each GPU in the plurality of GPUs holding the same model copy.

In one implementation, step S107 specifically includes the following steps:

dividing a storage region in each GPU where model parameters and gradients are stored into N partitions according to the number of the GPUs 2N;

presetting sequence numbers of the 2N GPUs to be 0, 1, 2 . . . 2N-1 respectively;

within a cycle where the sequence number is k (k is an integer and 1≤k≤2N-1), replicating a preset partition in the N partitions from a GPU whose sequence number is i to a GPU whose sequence number is j, and merging the gradients, wherein i=(2m+k+1)% N, j=(2m+k+2)% N, m is an integer and 0≤m≤N-1; and for partition owners in the 2N GPUs, updating the model parameters according to gradient merging results in the corresponding partitions, wherein the partition owners are GPUs having gradient merging results in all other GPUs for a preset partition.

Further, step S107 further includes the following steps:

within a cycle where the sequence number is k, replicating a preset partition in the N partitions from a GPU whose sequence number is a to a GPU whose sequence number is b, wherein a=(2m+k) % N, and b=(2m+k+1)% N.

Further reference can be made to FIGS. 10-11 and related description for the above gradient accumulation, parameter updating and distribution processes.

According to the method of this embodiment, 1/N corresponding to the whole model parameter is maintained on each worker group (GPU) whose group number is an odd number (1, 3, 5, . . . ), according to a linear topology, only (1/N)*M of the amount of data is transmitted in single data exchange, a parameter merging cycle is 2N-1, a parameter distribution cycle is also 2N-1, and thus it is deduced that used time of parameter exchange is 2*(2N-1)*(M/(N*W)), which is only 1/N (N=1, 2, 3, . . . ) of peer-to-peer time. So, the greater the concurrency value of data parallel is, the more significant the performance benefit of the linear topology is.

Figure 21:
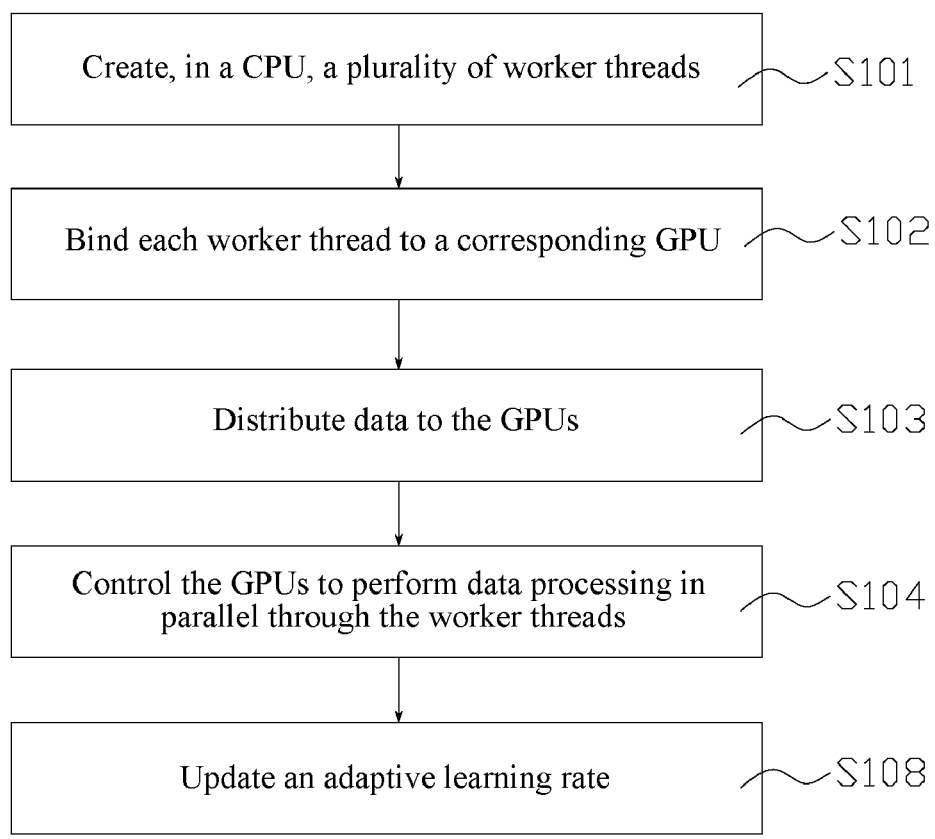
FIG. 21 is a flowchart of a data processing method according to a fourth embodiment.

FIG. 21 is a flowchart of a data processing method based on multiple GPUs according to a fourth embodiment of the present invention. The method of this embodiment is similar to the method shown in FIG. 18, and their difference is as follows: after step S104, the method further includes step S108: updating an adaptive learning rate of the model.

Step S108 may include the following steps:

for the partition owners, computing a learning rate learning_rate$_i$ of a parameter in the position i according to the following adaptive learning rate updating formula:

$$helper\_sum_i' = \sum_{j=0}^{GROUP\_NUM} helper\_sum\_part_{ij}'$$

$$learning\_rate_i = aggregating\_rate * \frac{adagrad\_rho}{adagrad\_rho + \sqrt{helper\_sum_i'}}$$

wherein GROUP_NUM denotes the number of worker groups, aggregating_rate denotes an aggregating learning rate, and adagrad_rho denotes auxiliary quantity for computing an adaptive learning rate; and for non-partition owners, computing a learning rate learning_rate$_i$ of a parameter in the position i according to the following adaptive learning rate updating formula:

$$helper\_sum\_part_{ij}'= 0$$

An actual application scenario in combination with an Adagrad algorithm: accumulation of helper_sum is actually a quantization process for adjusting each learning rate, which has certain approximation. Based on performance considerations, an approximate helper_sum is used for collection in an actual project: local accumulation helper_sum computing is carried out on all the partitions after each mini-batch ends, and after M (generally set as 8) mini-batches end, the mini-batches are pushed to the corresponding partition owners to complete ultimate accumulation. This gives consideration to both algorithm effects and training performance.

Figure 22:
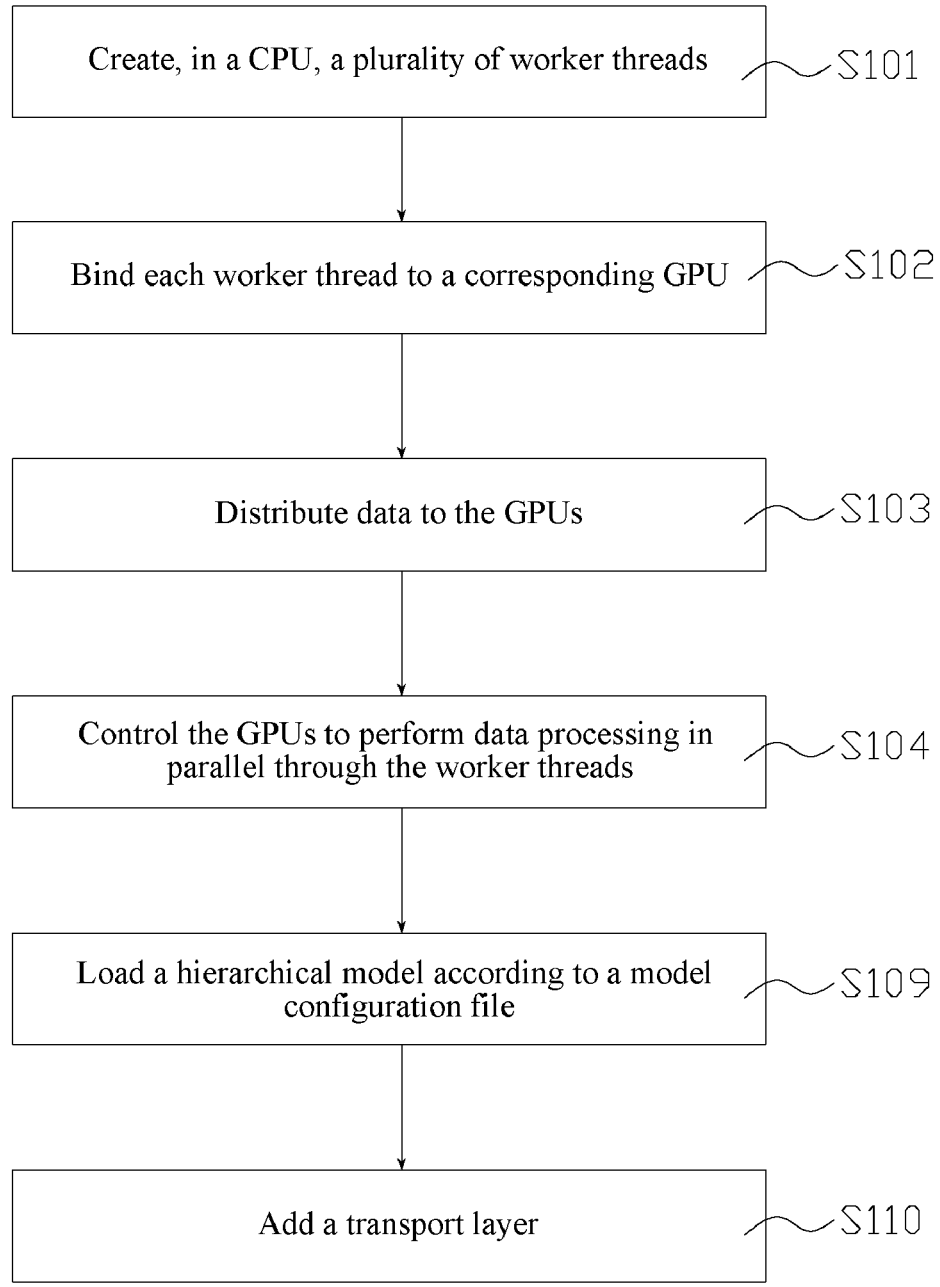
FIG. 22 is a flowchart of a data processing method according to a fifth embodiment.

FIG. 22 is a flowchart of a data processing method based on multiple GPUs according to a fifth embodiment of the present invention. The method of this embodiment is similar to the method shown in FIG. 18, and their difference is as follows: the method further includes the following steps:

Step S109: Load a hierarchical model according to a model configuration file of a CNN.

Step S110. If it is identified that two adjacent layers in the hierarchical model are completed by different GPUs, add a data transport layer between the two adjacent layers, the data transport layer being configured to transmit data between two GPUs through peer to peer.

The CNN network hierarchical model is actually a set of layers of a DAG assigned to each model parallel worker, and is a DAG topological sorting subset, and all subsets make up one group of models of the whole network.

The topological sorting set of the whole network:
{data, labels, conv1-1, conv1-2, pool1-1, pool1-2, rnorm1-1, rnorm1-2, conv2-1, conv2-2, pool2-1, pool2-2, rnorm2-1, rnorm2-2, conv3-1, conv3-2, conv4-1, conv4-2, conv5-1, conv5-2, pool5-1, pool5-2, fc6-1, fc6-2, fc7-1, fc7-2, fc8, probs, logprob}

The topological sorting subset assigned to a model parallel Worker 0:
{data, conv1-1, transfer_conv1-2, pool1-1, rnorm1-1, conv2-1, pool2-1, rnorm2-1, conv3-1, transfer_conv3-2, conv4-1, conv5-1, pool5-1, fc6-1, fc7-1, fc8, probs, transfer_labels, logprob}

The topological sorting subset assigned to a model parallel Worker 1:
{labels, conv1-2, pool1-2, rnorm1-2, transfer_conv3-1, conv3-2, conv4-2, conv5-2, pool5-2, fc6-2, fc7-2, transfer_fc8}

Therefore, during computing, the model parallel workers are advanced according to an array order: positively sequenced in the event of forward propagation, negatively sequenced in the event of backward propagation, thereby meeting the requirement for a computing sequence of network sub-models. Synchronization waiting control logic between the workers is controlled by a worker group engine on each worker so as to ensure parallelism and correctness of advances in model computing.

It can be seen that, a transport layer is added automatically to a sub-model topological sorting set after splitting, which is implemented for automatic reform of a training system. When model configuration is loaded, it is identified that two adjacent layers belong to different workers, that is, a computing operation is performed on different GPUs, and when remote data replication is required, a transport layer is added automatically between two layers, which is responsible for replicating output of an upper adjacent layer to a GPU to which a lower adjacent layer is bound during forward propagation, to serve as input thereof; and is responsible for replicating errors propagated from the lower adjacent layer to a GPU to which the upper adjacent layer is bound during backward propagation, used for computing backward gradients.

According to the method of this embodiment, storage access efficiency is enhanced by introducing a transport layer when data synchronization is required between different GPUs, thereby speeding up data processing.

Figure 23:
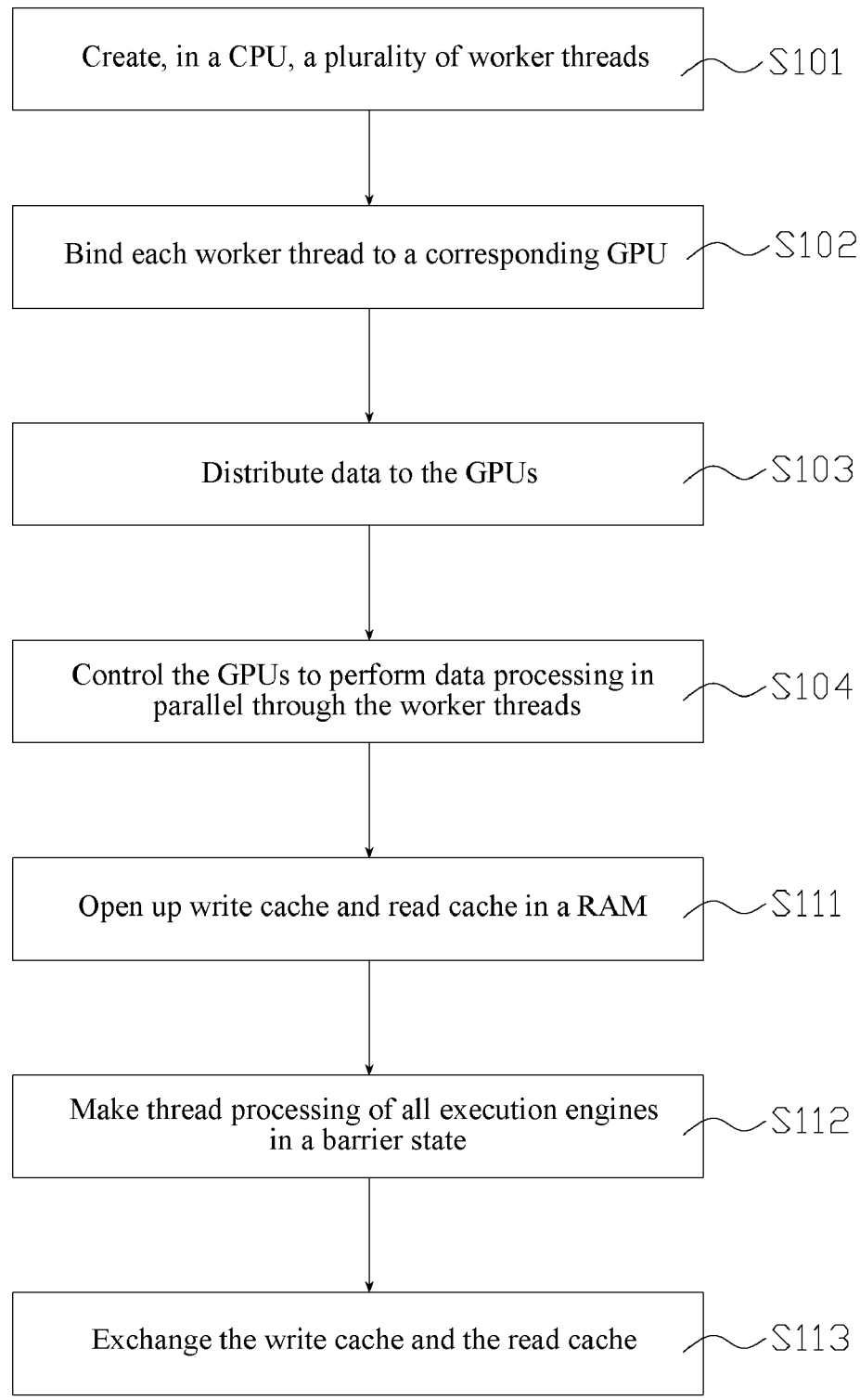
FIG. 23 is a flowchart of a data processing method according to a sixth embodiment.

FIG. 23 is a flowchart of a data processing method based on multiple GPUs according to a sixth embodiment of the present invention. The method of this embodiment is similar to the method shown in FIG. 18, and their difference is as follows: the method further includes the following steps:

Step S111. Open up write cache and read cache in a RAM, sizes of the write cache and the read cache being the size of a storage structure configured to store one batch of training data*the total number of worker groups.

Step S112. Make processing of all the worker threads in a barrier state before the write cache is full.

Step S113. Exchange preset indexes pointing to the write cache and the read cache after the write cache is full.

Referring to FIG. 5, loading of training data is carried out uninterruptedly by setting two caches, thereby reducing the possibility that the GPUs wait for the CPU to perform an I/O operation, enhancing the utilization of GPUs specifically performing data processing, and enhancing the overall data processing efficiency.

Figure 24:
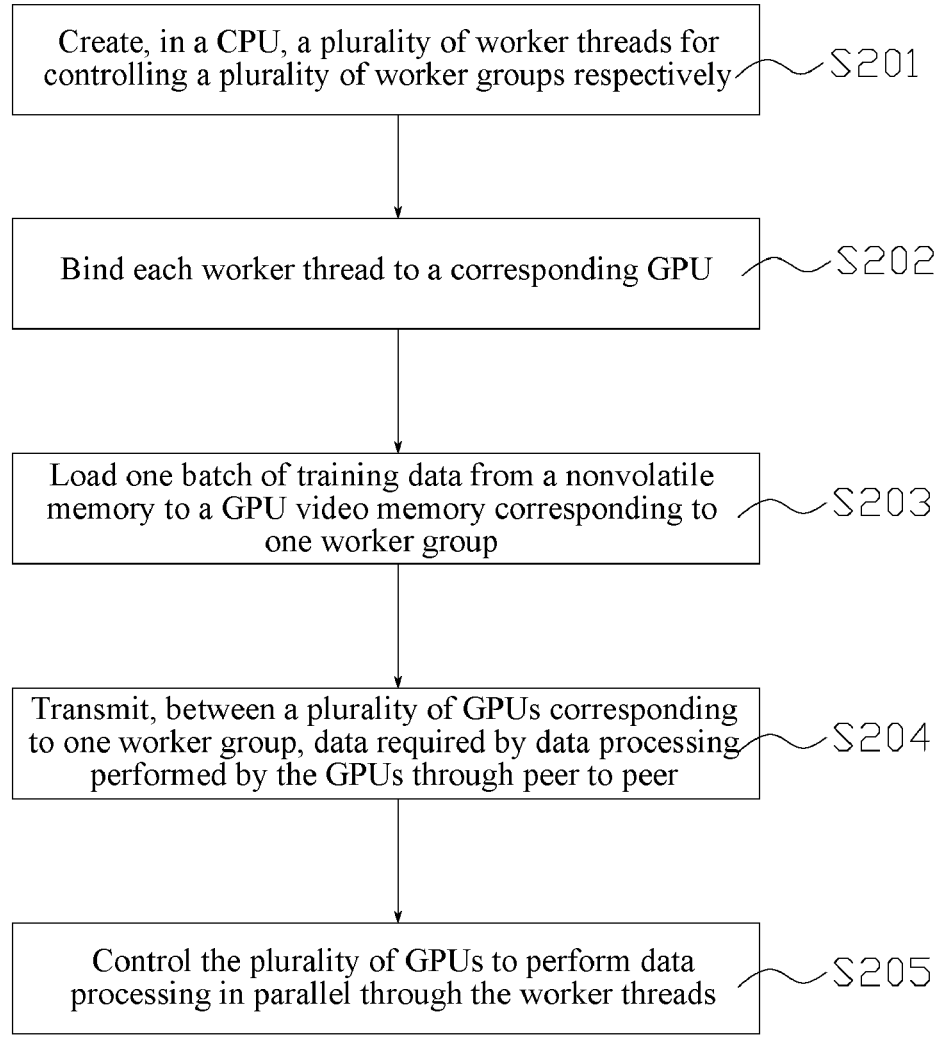
FIG. 24 is a flowchart of a data processing method according to a seventh embodiment.

FIG. 24 is a flowchart of a data processing method based on multiple GPUs according to a seventh embodiment of the present invention. The method of this embodiment includes the following steps:

Step S201. Create, in a CPU, a plurality of worker threads for controlling a plurality of worker groups respectively, the worker groups including a plurality of GPUs.

The number of the worker groups is the concurrency number for model parallel training. That is to say, if four channels of concurrent training are performed on the same model, four worker groups are needed. Referring to FIG. 12, in this embodiment, each worker group may include two GPUs. It may be understood that one worker group may include more GPUs. For each GPU in the worker group, a separate worker thread is created, the worker thread being used for executing control logic of the GPU training flow.

Step 202. Bind each worker thread to a corresponding GPU.

The binding each worker thread to a corresponding GPU refers to establishing a mapping relationship between different GPUs and worker threads. For example, for a worker group Worker Group 0, different worker threads may be bound to GPUs 0 and 1 respectively.

Step 203. Load one batch of training data from a nonvolatile memory to a GPU corresponding to one worker group.

The nonvolatile memory, for example, is a nonvolatile memory such as a magnetic disk, a flash memory, a solid-state memory or an optical disk, and original data associated with training, for example, models and each batch of data are stored in the nonvolatile memory in a form of files.

Referring to FIG. 6, in the whole training process, it is necessary to first replicate data from a nonvolatile memory to a main memory (RAM), and then it is necessary to replicate training data from the main memory to a video memory for parallel processing.

Further, referring to FIG. 16, only one GPU in one worker group has a data access layer, and thus data in the main memory can only be replicated to the GPU having the data access layer.

Step S204. Transmit, between a plurality of GPUs corresponding to one worker group, data required by data processing performed by the GPUs through peer to peer.

In step S202, specifically, forward propagation is responsible for replicating output of an upper adjacent layer to a GPU to which a lower adjacent layer is bound, to serve as input thereof; and backward propagation is responsible for replicating errors propagated from the lower adjacent layer to a GPU to which the upper adjacent layer is bound, used for computing backward gradients.

Step S205. Perform data processing in parallel through the plurality of GPUs corresponding to one worker thread.

Figure 15:
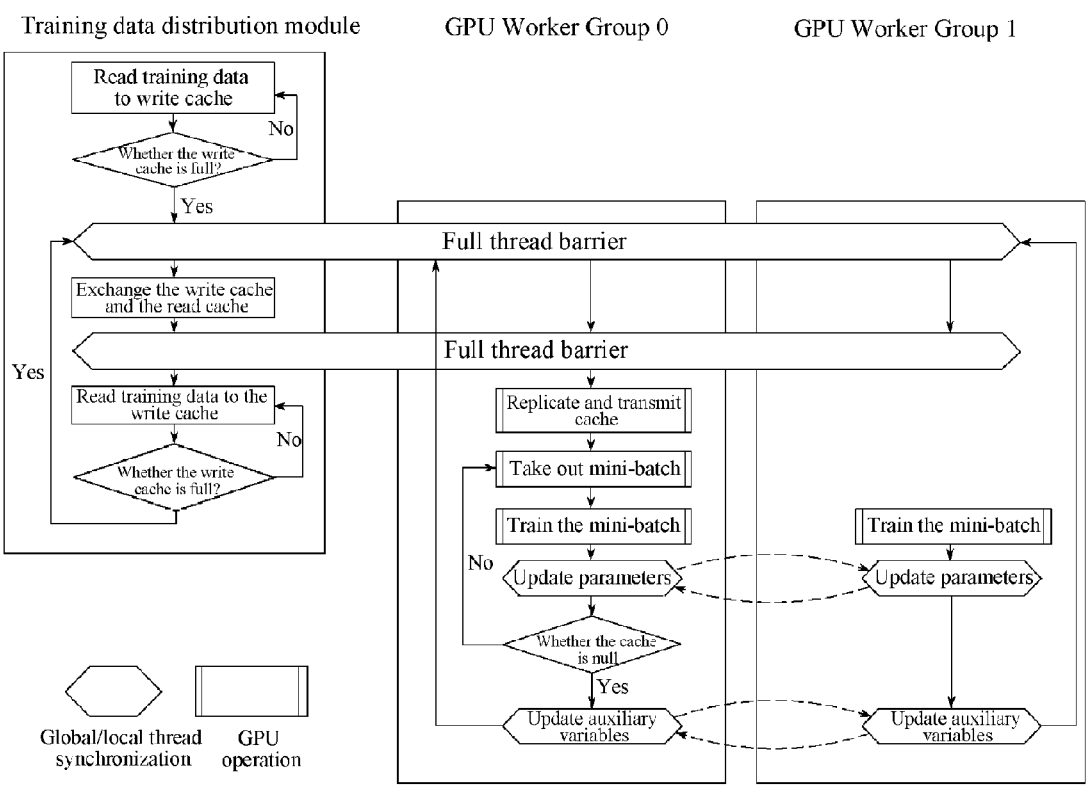
FIG. 15 is a flowchart of control over a data processing method according to one embodiment of the present invention.

After the training data is replicated into the GPUs, the GPUs can process the training data to acquire a processing result. Further reference can be made to FIG. 15 for the control logic of the whole processing flow.

According to the method of this embodiment, storage access efficiency is enhanced by introducing a transport layer when data synchronization is required between different GPUs, thereby speeding up data processing.

Figure 25:
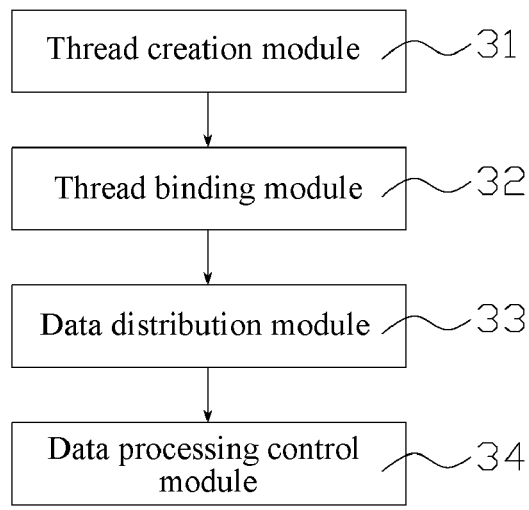
FIG. 25 is a module diagram of a data processing apparatus according to an eighth embodiment.

FIG. 25 is a module diagram of a data processing apparatus according to an eighth embodiment. The data processing apparatus of this embodiment includes: a thread creation module 31, a thread binding module 32, a data distribution module 33 and a data processing control module 34. It may be understood that the data processing apparatus of this embodiment may be specific implementation of the parallel data processing module 124 in FIG. 2.

The thread creation module 31 is configured to create, in a CPU, a plurality of worker threads for controlling a plurality of worker groups respectively, the worker groups including one or more GPUs. The number of the worker groups is the concurrency number for model parallel training. That is to say, if four channels of concurrent training are performed on the same model, four worker groups are needed. Referring to FIG. 3 and FIG. 12 respectively, each worker group may include one or more (e.g. two or more) GPUs. For each GPU in the worker group, a separate worker thread is created, the worker thread being used for executing control logic of the GPU training flow.

The thread creation module 31 may be further configured to create one I/O thread, and load the plurality of batches of training data into a RAM through the I/O thread. The I/O thread, threads in the thread pool, the thread pool used for pre-processing the training data and data processing in the GPUs are performed in parallel.

The thread binding module 32 is configured to bind each worker thread to a corresponding GPU. The binding each worker thread to a corresponding GPU refers to establishing a mapping relationship between different GPUs and worker threads. Specifically, the mapping relationship between worker threads and GPUs can be stored by storing a two-dimensional mapping table, as shown in Table 1. It may be understood that, if one model only needs to use one GPU, in step S102, GPUs one-to-one correspond to worker threads; when one model needs to use a plurality of GPUs, in addition to step S102, it is also necessary to associate a plurality of worker threads with one worker group.

The data distribution module 33 is configured to load a plurality of batches of training data from a nonvolatile memory to GPU video memories in the plurality of worker groups. The nonvolatile memory, for example, is a nonvolatile memory such as a magnetic disk, a flash memory, a solid-state memory or an optical disk, and original data associated with training, for example, models and each batch of data are stored in the nonvolatile memory in a form of files.

Referring to FIG. 6, in the whole training process, it is necessary to first replicate data from a nonvolatile memory to a main memory (RAM), and then it is necessary to replicate training data from the main memory to a video memory for parallel processing.

The data processing control module 34 controls the plurality of GPUs to perform data processing in parallel through the worker threads. After the training data is replicated into the GPUs, the GPUs can process the training data to acquire a processing result. Further reference can be made to FIG. 5 for the control logic of the whole processing flow.

According to the apparatus of this embodiment, specific processing operations are performed in a plurality of GPUs, and scheduling of each GPU is implemented by an exclusive CPU thread, therefore, in the whole data processing process, both the processing operations in the GPUs and thread scheduling in the CPU run in parallel, thereby enhancing data processing efficiency.

Figure 26:
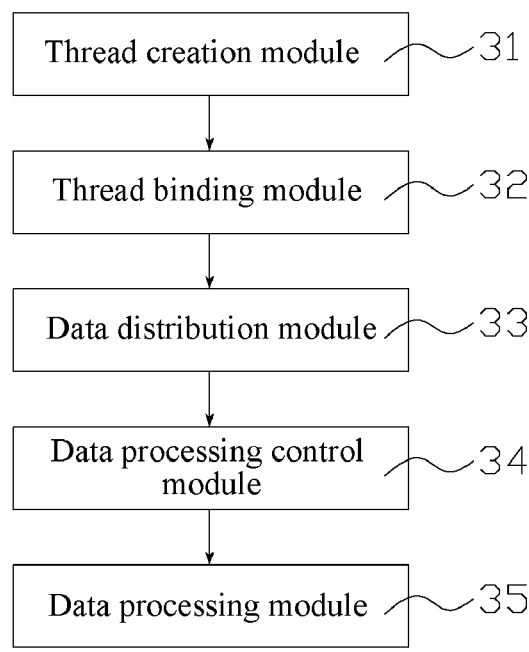
FIG. 26 is a module diagram of a data processing apparatus according to a ninth embodiment.

FIG. 26 is a module diagram of a data processing apparatus according to a ninth embodiment. The apparatus of this embodiment is similar to the apparatus shown in FIG. 25, and their difference is as follows: the apparatus further includes a data processing module 35, configured to pre-process the training data on the CPU through a thread pool.

Full use can be made to all the remaining CPU resources for data processing by use of the thread pool. Overall, a triple parallel flow line is performed all the time during the CNN training of this embodiment: computing the current batch of data, pre-processing next batch of data, and reading next batch of data.

Referring to FIG. 7, except that reading batch data and processing batch data need to spend extra initialization time at the beginning of the training process, in the processing process of all the remaining batches of data, data processing in the GPUs and data reading and processing in the CPU are completed in parallel, and it is unnecessary to wait for CPU reading data and processing results between data processing between different batches in the GPUs, therefore, parallel computing capability of the GPUs is fully used, thereby enhancing the training efficiency.

Figure 27:
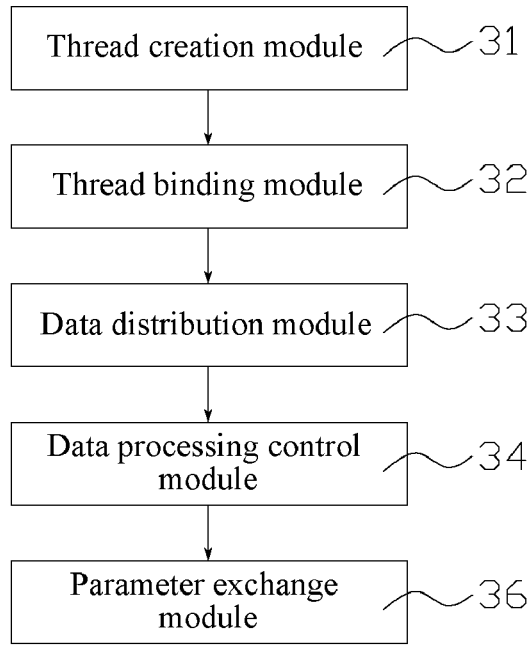
FIG. 27 is a module diagram of a data processing apparatus according to a tenth embodiment.

FIG. 27 is a module diagram of a data processing apparatus according to a tenth embodiment. The apparatus of this embodiment is similar to the apparatus shown in FIG. 25, and their difference is as follows: the apparatus further includes a parameter exchange module 36, configured to: accumulate gradients of a plurality of GPUs holding the same model copy, update model parameters according to the accumulated gradients, and distribute the latest model parameters to each GPU in the plurality of GPUs holding the same model copy.

Specifically, the parameter exchange module 36 is configured to perform the following steps:

divide a storage region in each GPU where model parameters and gradients are stored into N partitions according to the number of the GPUs 2N;

preset sequence numbers of the 2N GPUs to be 0, 1, 2 ... 2N−1 respectively;

within a cycle where the sequence number is k (k is an integer and 1≤k≤2N−1), replicate a preset partition in the N partitions from a GPU whose sequence number is i to a GPU whose sequence number is j, and merge the gradients, wherein i=(2m+k+1)% N, j=(2m+k+2)% N, m is an integer and 0≤m≤N−1; and for partition owners in the 2N GPUs, update the model parameters according to gradient merging results in the corresponding partitions, wherein the partition owners are GPUs having gradient merging results in all other GPUs for a preset partition.

Further, the parameter exchange module 36 is further configured to:

within a cycle where the sequence number is k, replicate a preset partition in the N partitions from a GPU whose sequence number is a to a GPU whose sequence number is b, wherein a=(2m+k) % N, and b=(2m+k+1)% N.

Further reference can be made to FIGS. 10-11 and related description for the above gradient accumulation, parameter updating and distribution processes.

According to the apparatus of this embodiment, 1/N corresponding to the whole model parameter is maintained on each worker group (GPU) whose group number is an odd number (1, 3, 5, ... ), according to a linear topology, only (1/N)*M of the amount of data is transmitted in single data exchange, a parameter merging cycle is 2N−1, a parameter distribution cycle is also 2N−1, and thus it is deduced that used time of parameter exchange is 2*(2N−1)*(M/(N*W)), which is only 1/N (N=1, 2, 3, ... ) of peer-to-peer time. So, the greater the concurrency value of data parallel is, the more significant the performance benefit of the linear topology is.

Figure 28:
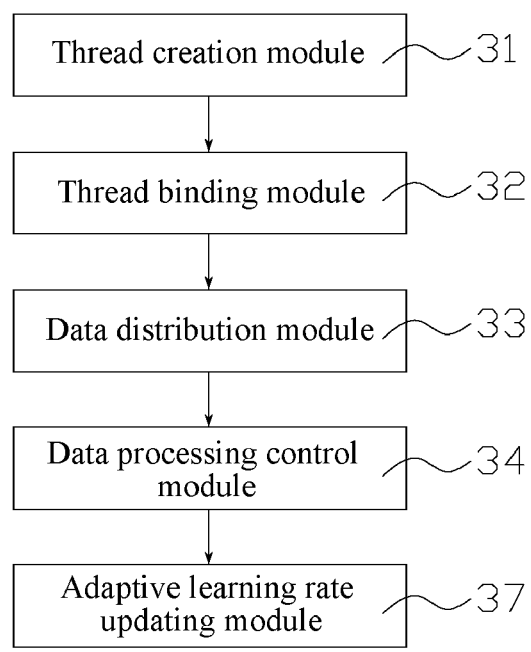
FIG. 28 is a module diagram of a data processing apparatus according to an eleventh embodiment.

FIG. 28 is a module diagram of a data processing apparatus according to an eleventh embodiment. The apparatus of this embodiment is similar to the apparatus shown in FIG. 25, and their difference is as follows: the apparatus further includes an adaptive learning rate updating module 37, configured to: update an adaptive learning rate of the model:

for the partition owners, compute a learning rate learning_rate$_i$ of a parameter in the position i according to the following adaptive learning rate updating formula:

$$\text{helper\_sum}_i^r = \sum_{j=0}^{GROUP\_NUM} \text{helper\_sum\_part}_{ij}^r$$

$$\text{learning\_rate}_i = \text{aggregating\_rate} * \frac{\text{adagrad\_rho}}{\text{adagrad\_rho} + \sqrt{\text{helper\_sum}_i^r}}$$

wherein GROUP_NUM denotes the number of worker groups, aggregating_rate denotes an aggregating learning rate, and adagrad_rho denotes auxiliary quantity for computing an adaptive learning rate; and for non-partition owners, compute a learning rate learning_rate$_i$ of a parameter in the position i according to the following adaptive learning rate updating formula:

$$\text{helper\_sum\_part}_{ij}^r = 0$$

An actual application scenario in combination with an Adagrad algorithm: accumulation of helper_sum is actually a quantization process for adjusting each learning rate, which has certain approximation. Based on performance considerations, an approximate helper_sum is used for collection in an actual project: local accumulation helper_sum computing is carried out on all the partitions after each mini-batch ends, and after M (generally set as 8) mini-batches end, the mini-batches are pushed to the corresponding partition owners to complete ultimate accumulation. This gives consideration to both algorithm effects and training performance.

Figure 29:
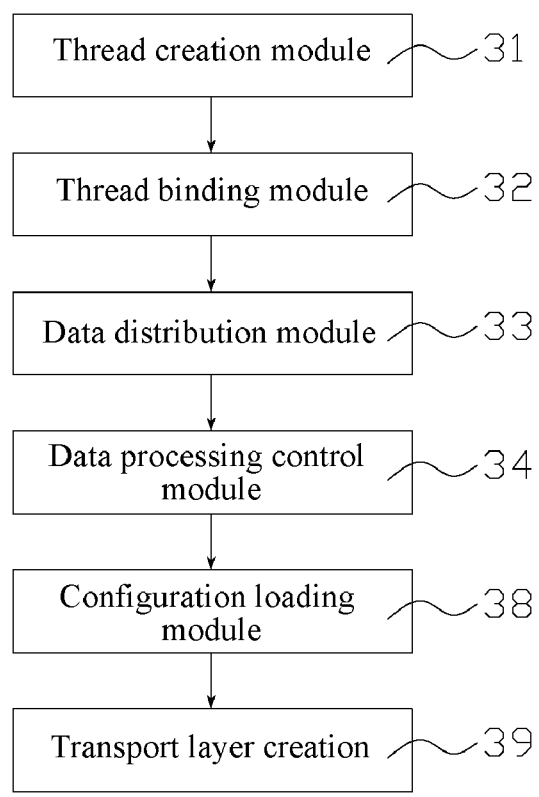
FIG. 29 is a module diagram of a data processing apparatus according to a twelfth embodiment.

FIG. 29 is a module diagram of a data processing apparatus according to a twelfth embodiment. The apparatus of this embodiment is similar to the apparatus shown in FIG. 25, and their difference is as follows: the apparatus further includes:

a configuration loading module 38, configured to load a hierarchical model according to a model configuration file of a CNN; and a transport layer creation module 39, configured to, if it is identified that two adjacent layers in the hierarchical model are completed by different GPUs, add a data transport layer between the two adjacent layers, the data transport layer being configured to transmit data between two GPUs through peer to peer.

The CNN network hierarchical model is actually a set of layers of a DAG assigned to each model parallel worker, and is a DAG topological sorting subset, and all subsets make up one group of models of the whole network.

The topological sorting set of the whole network:
{data, labels, conv1-1, conv1-2, pool1-1, pool1-2, rnorm1-1, rnorm1-2, conv2-1, conv2-2, pool2-1, pool2-2, rnorm2-1, rnorm2-2, conv3-1, conv3-2, conv4-1, conv4-2, conv5-1, conv5-2, pool5-1, pool5-2, fc6-1, fc6-2, fc7-1, fc7-2, fc8, probs, logprob}

The topological sorting subset assigned to a model parallel Worker 0:
{data, conv1-1, transfer_conv1-2, pool1-1, rnorm1-1, conv2-1, pool2-1, rnorm2-1, conv3-1, transfer_conv3-2, conv4-1, conv5-1, pool5-1, fc6-1, fc7-1, fc8, probs, transfer_labels, logprob}

The topological sorting subset assigned to a model parallel Worker 1:
{labels, conv1-2, pool1-2, rnorm1-2, transfer_conv3-1, conv3-2, conv4-2, conv5-2, pool5-2, fc6-2, fc7-2, transfer_fc8}

Therefore, during computing, the model parallel workers are advanced according to an array order: positively sequenced in the event of forward propagation, negatively sequenced in the event of backward propagation, thereby meeting the requirement for a computing sequence of network sub-models. Synchronization waiting control logic between the workers is controlled by a worker group engine on each worker so as to ensure parallelism and correctness of advances in model computing.

It can be seen that, a transport layer is added automatically to a sub-model topological sorting set after splitting, which is implemented for automatic reform of a training system. When model configuration is loaded, it is identified that two adjacent layers belong to different workers, that is, a computing operation is performed on different GPUs, and when remote data replication is required, a transport layer is added automatically between two layers, which is responsible for replicating output of an upper adjacent layer to a GPU to which a lower adjacent layer is bound during forward propagation, to serve as input thereof; and is responsible for replicating errors propagated from the lower adjacent layer to a GPU to which the upper adjacent layer is bound during backward propagation, used for computing backward gradients.

According to the method of this embodiment, storage access efficiency is enhanced by introducing a transport layer when data synchronization is required between different GPUs, thereby speeding up data processing.

Figure 30:
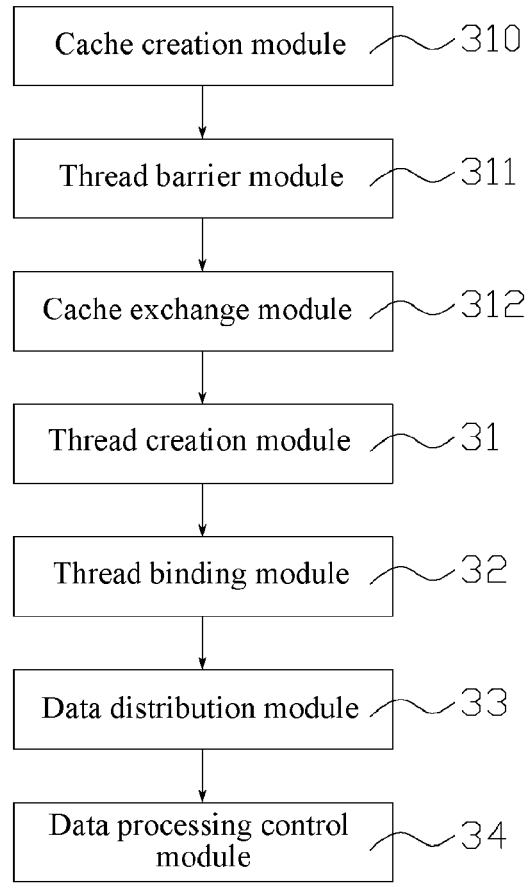
FIG. 30 is a module diagram of a data processing apparatus according to a thirteenth embodiment.

FIG. 30 is a module diagram of a data processing apparatus according to a thirteenth embodiment. The apparatus of this embodiment is similar to the apparatus shown in FIG. 25, and their difference is as follows: the apparatus further includes:

a cache creation module 310, configured to open up write cache and read cache in a RAM, sizes of the write cache and the read cache being the size of a storage structure configured to store one batch of training data*the total number of worker groups;

a thread barrier module 311, configured to make processing of all the worker threads in a barrier state before the write cache is full; and a cache exchange module 312, configured to exchange preset indexes pointing to the write cache and the read cache after the write cache is full.

Referring to FIG. 5, loading of training data is carried out uninterruptedly by setting two caches, thereby reducing the possibility that the GPUs wait for the CPU to perform an I/O operation, enhancing the utilization of GPUs specifically performing data processing, and enhancing the overall data processing efficiency.

Figure 31:
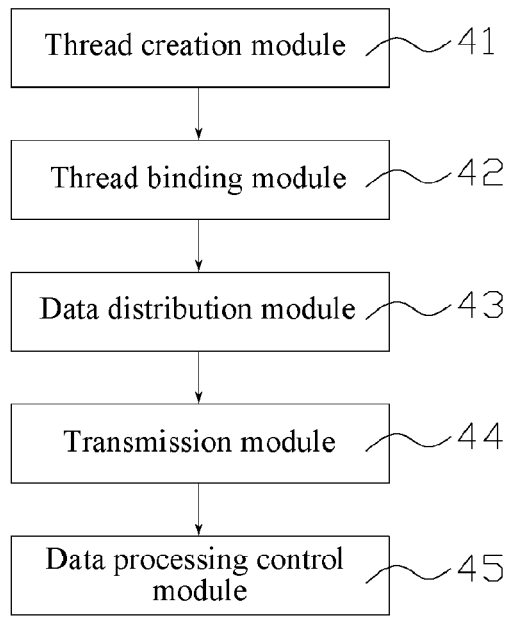
FIG. 31 is a module diagram of a data processing apparatus according to a fourteenth embodiment.

FIG. 31 is a module diagram of a data processing apparatus according to a fourteenth embodiment. The data processing apparatus of this embodiment includes: a thread creation module 41, a thread binding module 42, a data distribution module 43, a transmission module 44 and a data processing control module 45.

The thread creation module 41 is configured to create in a CPU, a plurality of worker threads for controlling a plurality of worker groups respectively, the worker groups including a plurality of GPUs.

The number of the worker groups is the concurrency number for model parallel training. That is to say, if four channels of concurrent training are performed on the same model, four worker groups are needed. Referring to FIG. 12, in this embodiment, each worker group may include two GPUs. It may be understood that one worker group may include more GPUs. For each GPU in the worker group, a separate worker thread is created, the worker thread being used for executing control logic of the GPU training flow.

The thread binding module 42 is configured to bind each worker thread to a corresponding GPU. The binding each worker thread to a corresponding GPU refers to establishing a mapping relationship between different GPUs and worker threads. For example, for a worker group Worker Group 0, different worker threads may be bound to GPUs 0 and 1 respectively.

The data distribution module 43 is configured to load one batch of training data from a nonvolatile memory to a GPU corresponding to one worker group. The nonvolatile memory, for example, is a nonvolatile memory such as a magnetic disk, a flash memory, a solid-state memory or an optical disk, and original data associated with training, for example, models and each batch of data are stored in the nonvolatile memory in a form of files.

Referring to FIG. 6, in the whole training process, it is necessary to first replicate data from a nonvolatile memory to a main memory (RAM), and then it is necessary to replicate training data from the main memory to a video memory for parallel processing.

Further, referring to FIG. 16, only one GPU in one worker group has a data access layer, and thus data in the main memory can only be replicated to the GPU having the data access layer.

The transmission module 44 is configured to transmit, between a plurality of GPUs corresponding to one worker group, data required by data processing performed by the GPUs through peer to peer.

The data processing control module 45 is configured to perform data processing in parallel through the plurality of GPUs corresponding to one worker thread.

After the training data is replicated into the GPUs, the GPUs can process the training data to acquire a processing result. Further reference can be made to FIG. 15 for the control logic of the whole processing flow.

According to the method of this embodiment, storage access efficiency is enhanced by introducing a transport layer when data synchronization is required between different GPUs, thereby speeding up data processing.

In addition, the embodiments of the present invention further provide a computer readable storage medium, with a computer executable instruction stored therein, and the computer readable storage medium, for example, is a non-volatile memory such as an optical disk, a hard disk or a flash memory. The computer executable instruction is used for making a computer or a similar operation apparatus complete various operations in the parallel data processing method based on multiple GPUs.

The sequence numbers of the above embodiments of the disclosure are only for the purpose of description, and do not represent one embodiment is superior to another.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A parallel data processing method based on multiple graphic processing units (GPUs), comprising:
creating, in a central processing unit (CPU), a plurality of worker threads for controlling a plurality of worker groups respectively, the worker groups comprising a plurality of GPUs;
binding each worker thread to a corresponding GPU;
loading one batch of training data from a nonvolatile memory to a GPU video memory corresponding to one worker group;
transmitting, between a plurality of GPUs corresponding to one worker group, data required by data processing performed by the GPUs through peer to peer; and
controlling the plurality of GPUs to perform data processing in parallel through the worker threads;
the method further comprising:
opening up write cache and read cache in a random access memory (RAM), sizes of the write cache and the read cache being the size of a storage structure configured to store one batch of training data*the total number of worker groups;
processing all the worker threads in a barrier state before the write cache is full; and
exchanging preset indexes pointing to the write cache and the read cache after the write cache is full.

2. The method according to claim 1, comprising:
creating one I/O thread, and loading the plurality of batches of training data into a random memory through the I/O thread; and
pre-processing the training data on the CPU through a thread pool, wherein the I/O thread, threads in the thread pool, the worker threads and data processing in the CPU are performed in parallel.

3. The method according to claim 1, comprising:
dividing a storage region in each GPU where model parameters and gradients are stored into N partitions according to the number of the GPUs 2N;
presetting sequence numbers of the 2N GPUs to be 0, 1, 2 . . . 2N−1 respectively;
within a cycle where the sequence number is k (k is an integer and 1≤k≤2N−1), replicating a preset partition in the N partitions from a GPU whose sequence number is i to a GPU whose sequence number is j, and merging the gradients, wherein i=(2m+k+1)% N, j=(2m+k+2)% N, m is an integer and 0≤m≤N−1; and
for partition owners in the 2N GPUs, updating the model parameters according to gradient merging results in the corresponding partitions, wherein the partition owners are GPUs having gradient merging results in all other GPUs for a preset partition.

4. The method according to claim 3, comprising:
within a cycle where the sequence number is k, replicating a preset partition in the N partitions from a GPU whose sequence number is a to a GPU whose sequence number is b, wherein a=(2m+k) % N, and b=(2m+k+1)% N.

5. The method according to claim 3, comprising:
for the partition owners, computing a learning rate learning_rate$_i$ of a parameter in the position i according to the following adaptive learning rate updating formula:

$$\text{helper\_sum}_i^r = \sum_{j=0}^{GROUP\_NUM} \text{helper\_sum\_part}_{i,j}^r$$

$$\text{learning\_rate}_i = \text{aggregating\_rate} * \frac{\text{adagrad\_rho}}{\text{adagrad\_rho} + \sqrt{\text{helper\_sum}_i^r}}$$

wherein GROUP_NUM denotes the number of worker groups, aggregating rate denotes an aggregating learning rate, and adagrad_rho denotes auxiliary quantity for computing an adaptive learning rate; and
for non-partition owners, computing a learning rate learning_rate$_i$ of a parameter in the position i according to the following adaptive learning rate updating formula:

$$\text{helper\_sum\_part}_{i,j}^r = 0.$$

6. The method according to claim 1, comprising:
loading a hierarchical model according to a model configuration file of a convolutional neural network; and
if it is identified that two adjacent layers in the hierarchical model are completed by different GPUs, adding a data transport layer between the two adjacent layers, the data transport layer being configured to perform the step of transmitting, between a plurality of GPUs corresponding to one worker group, data required by data processing performed by the GPUs through peer to peer.

7. The method according to claim 1, wherein the controlling the plurality of GPUs to perform data processing in parallel through the worker threads comprises: controlling a plurality of GPUs in the same worker group to respectively train different parts of the same model through the worker threads.

8. A data parallel processing apparatus based on multiple graphic processing units (GPUs), comprising:
   a thread creation module, configured to create, in a central processing unit (CPU), a plurality of worker threads for controlling a plurality of worker groups respectively, the worker groups comprising a plurality of GPUs;
   a thread binding module, configured to bind each worker thread to a corresponding GPU;
   a data distribution module, configured to load one batch of training data from a nonvolatile memory to a GPU video memory corresponding to one worker group;
   a transmission module, configured to transmit, between a plurality of GPUs corresponding to one worker group, data required by data processing performed by the GPUs through peer to peer; and
   a data processing control module, configured to control the plurality of GPUs to perform data processing in parallel through the worker threads;
   the apparatus further comprising:
   a cache creation module, configured to open up write cache and read cache in a random access memory (RAM), sizes of the write cache and the read cache being the size of a storage structure configured to store one batch of training data*the total number of worker groups;
   a thread barrier module, configured to process all the worker threads in a barrier state before the write cache is full; and
   a cache exchange module, configured to exchange preset indexes pointing to the write cache and the read cache after the write cache is full.

9. The apparatus according to claim 8, wherein the thread creation module is further configured to create one I/O thread, and load the plurality of batches of training data into a random memory through the I/O thread; and
   a data processing module, configured to pre-process the training data on the CPU through a thread pool;
   wherein the I/O thread, threads in the thread pool, the worker threads and data processing in the CPU are performed in parallel.

10. The apparatus according to claim 8, wherein the apparatus further comprises a parameter exchange module, configured to:
   divide a storage region in each GPU where model parameters and gradients are stored into N partitions according to the number of the GPUs 2N;
   preset sequence numbers of the 2N GPUs to be 0, 1, 2 . . . 2N−1 respectively;
   within a cycle where the sequence number is k (k is an integer and 1≤k≤2N−1), replicate a preset partition in the N partitions from a GPU whose sequence number is i to a GPU whose sequence number is j, and merge the gradients, wherein i=(2m+k+1)% N, j=(2m+k+2)% N, m is an integer and 0≤m≤N−1; and
   for partition owners in the 2N GPUs, update the model parameters according to gradient merging results in the corresponding partitions, wherein the partition owners are GPUs having gradient merging results in all other GPUs for a preset partition.

11. The apparatus according to claim 10, wherein the parameter exchange module is further configured to:
   within a cycle where the sequence number is k, replicate a preset partition in the N partitions from a GPU whose sequence number is a to a GPU whose sequence number is b, wherein a=(2m+k) % N, and b=(2m+k+1)% N.

12. The apparatus according to claim 10, comprising an adaptive learning rate updating module, configured to:
   for the partition owners, compute a learning rate learning_rate$_i$ of a parameter in the position i according to the following adaptive learning rate updating formula:

$$\text{helper\_sum}_i^r = \sum_{j=0}^{GROUP\_NUM} \text{helper\_sum\_part}_{ij}^r$$

$$\text{learning\_rate}_i = \text{aggregating\_rate} * \frac{\text{adagrad\_rho}}{\text{adagrad\_rho} + \sqrt{\text{helper\_sum}_i^r}}$$

wherein GROUP_NUM denotes the number of worker groups, aggregating rate denotes an aggregating learning rate, and adagrad_rho denotes auxiliary quantity for computing an adaptive learning rate; and
   for non-partition owners, compute a learning rate learning rate, of a parameter in the position i according to the following adaptive learning rate updating formula:

$$\text{helper\_sum\_part}_{ij}^r = 0.$$

13. The apparatus according to claim 8, comprising:
   a configuration loading module, configured to load a hierarchical model according to a model configuration file of a convolutional neural network; and
   if it is identified that two adjacent layers in the hierarchical model are completed by different GPUs, adding a data transport layer between the two adjacent layers, the data transport layer being configured to perform the step of transmitting, between a plurality of GPUs corresponding to one worker group, data required by data processing performed by the GPUs through peer to peer.

14. The apparatus according to claim 8, wherein the data processing control module is configured to: control a plurality of GPUs in the same worker group to respectively train different parts of the same model through the worker threads.

* * * * *